United States Patent
Bellare et al.

(10) Patent No.: US 8,787,583 B2
(45) Date of Patent: *Jul. 22, 2014

(54) SYSTEMS AND METHODS FOR DISTRIBUTING AND SECURING DATA

(75) Inventors: Mihir Bellare, San Diego, CA (US); Phillip Rogaway, Davis, CA (US)

(73) Assignee: Security First Corp., Rancho Santa Margarita, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,111

(22) Filed: Mar. 5, 2012

(65) Prior Publication Data

US 2012/0163592 A1   Jun. 28, 2012

Related U.S. Application Data

(63) Continuation of application No. 11/983,355, filed on Nov. 7, 2007, now Pat. No. 8,155,322.

(60) Provisional application No. 60/857,345, filed on Nov. 7, 2006.

(51) Int. Cl.
*G06F 21/00* (2013.01)
*H04L 9/28* (2006.01)

(52) U.S. Cl.
USPC .............................. 380/286; 380/28; 713/180

(58) Field of Classification Search
None
See application file for complete search history.

(56) References Cited

U.S. PATENT DOCUMENTS

| | | | |
|---|---|---|---|
| 4,453,074 A | 6/1984 | Weinstein | |
| 4,924,513 A | 5/1990 | Herbison et al. | |
| 4,932,057 A | 6/1990 | Kolbert | |
| 5,010,572 A | 4/1991 | Bathrick et al. | |
| 5,016,274 A | 5/1991 | Micali et al. | |
| 5,051,745 A | 9/1991 | Katz | |
| 5,268,963 A | 12/1993 | Monroe et al. | |
| 5,375,244 A | 12/1994 | McNair | |
| 5,386,104 A | 1/1995 | Sime | |

(Continued)

FOREIGN PATENT DOCUMENTS

| EP | 346180 | 12/1989 |
|---|---|---|
| EP | 354774 | 2/1990 |

(Continued)

OTHER PUBLICATIONS

Barlas, "RSA's Security Showcase", Line56.com—The E-Business Executive Daily, Apr. 15, 2003.

(Continued)

*Primary Examiner* — Gilberto Barron, Jr.
*Assistant Examiner* — Malcolm Cribbs
(74) *Attorney, Agent, or Firm* — Ropes & Gray LLP

(57) ABSTRACT

A robust computational secret sharing scheme that provides for the efficient distribution and subsequent recovery of a private data is disclosed. A cryptographic key may be randomly generated and then shared using a secret sharing algorithm to generate a collection of key shares. The private data may be encrypted using the key, resulting in a ciphertext. The ciphertext may then be broken into ciphertext fragments using an Information Dispersal Algorithm. Each key share and a corresponding ciphertext fragment are provided as input to a committal method of a probabilistic commitment scheme, resulting in a committal value and a decommittal value. The share for the robust computational secret sharing scheme may be obtained by combining the key share, the ciphertext fragment, the decommittal value, and the vector of committal values.

19 Claims, 11 Drawing Sheets

(56) References Cited

U.S. PATENT DOCUMENTS

| | | |
|---|---|---|
| 5,485,474 A | 1/1996 | Rabin |
| 5,524,073 A | 6/1996 | Stambler |
| 5,615,269 A | 3/1997 | Micali |
| 5,642,508 A | 6/1997 | Miyazawa |
| 5,666,414 A | 9/1997 | Micali |
| 5,666,416 A | 9/1997 | Micali |
| 5,682,425 A | 10/1997 | Enari |
| 5,703,907 A | 12/1997 | James |
| 5,717,758 A | 2/1998 | Micall |
| 5,748,735 A | 5/1998 | Ganesan |
| 5,761,306 A | 6/1998 | Lewis |
| 5,768,382 A | 6/1998 | Schneier et al. |
| 5,768,519 A | 6/1998 | Swift et al. |
| 5,790,677 A | 8/1998 | Fox et al. |
| 5,823,948 A | 10/1998 | Ross, Jr. et al. |
| 5,903,652 A | 5/1999 | Mital |
| 5,903,882 A | 5/1999 | Asay et al. |
| 5,910,987 A | 6/1999 | Ginter et al. |
| 5,940,507 A | 8/1999 | Cane et al. |
| 5,960,083 A | 9/1999 | Micali |
| 5,966,444 A | 10/1999 | Yuan et al. |
| 5,966,448 A | 10/1999 | Namba et al. |
| 5,991,414 A | 11/1999 | Garay et al. |
| 6,009,177 A | 12/1999 | Sudia |
| 6,023,508 A | 2/2000 | Bombard et al. |
| 6,026,163 A | 2/2000 | Micali |
| 6,073,237 A | 6/2000 | Ellison |
| 6,092,201 A | 7/2000 | Turnbull et al. |
| 6,094,485 A | 7/2000 | Weinstein et al. |
| 6,134,550 A | 10/2000 | Van Oorschot et al. |
| 6,229,894 B1 | 5/2001 | Van Oorschot et al. |
| 6,240,183 B1 | 5/2001 | Marchant |
| 6,240,187 B1 | 5/2001 | Lewis |
| 6,301,659 B1 | 10/2001 | Micali |
| 6,314,409 B2 | 11/2001 | Schneck et al. |
| 6,324,650 B1 | 11/2001 | Ogilvie |
| 6,336,186 B1 | 1/2002 | Dyksterhouse et al. |
| 6,345,101 B1 | 2/2002 | Shukla |
| 6,345,314 B1 | 2/2002 | Cole et al. |
| 6,356,941 B1 | 3/2002 | Cohen |
| 6,363,425 B1 | 3/2002 | Hook et al. |
| 6,386,451 B1 | 5/2002 | Sehr |
| 6,424,718 B1 | 7/2002 | Holloway |
| 6,438,690 B1 | 8/2002 | Patel et al. |
| 6,449,730 B2 | 9/2002 | Mann et al. |
| 6,483,921 B1 | 11/2002 | Harkins |
| 6,553,493 B1 | 4/2003 | Okumura et al. |
| 6,615,347 B1 | 9/2003 | de Silva et al. |
| 6,625,734 B1 | 9/2003 | Marvit et al. |
| 6,978,367 B1 | 12/2005 | Hind et al. |
| 7,069,451 B1 | 6/2006 | Ginter et al. |
| 7,391,865 B2 | 6/2008 | Orsini et al. |
| 8,108,678 B1 * | 1/2012 | Boyen .................... 713/176 |
| 2001/0001876 A1 | 5/2001 | Morgan et al. |
| 2001/0051902 A1 | 12/2001 | Messner |
| 2002/0010679 A1 | 1/2002 | Felsher |
| 2002/0032663 A1 | 3/2002 | Messner |
| 2002/0046359 A1 | 4/2002 | Boden |
| 2002/0071566 A1 | 6/2002 | Kurn |
| 2002/0091640 A1 | 7/2002 | Gupta |
| 2002/0129235 A1 | 9/2002 | Okamoto et al. |
| 2002/0162047 A1 | 10/2002 | Peters et al. |
| 2003/0051054 A1 | 3/2003 | Redlich et al. |
| 2003/0051159 A1 | 3/2003 | McCown et al. |
| 2003/0058274 A1 | 3/2003 | Hill et al. |
| 2003/0070077 A1 | 4/2003 | Redlich et al. |
| 2003/0167408 A1 | 9/2003 | Fitzpatrick et al. |
| 2004/0111608 A1 | 6/2004 | Oom Temudo de Castro et al. |
| 2004/0122863 A1 | 6/2004 | Sidman |
| 2006/0177061 A1 | 8/2006 | Orsini et al. |
| 2006/0282681 A1 | 12/2006 | Scheidt et al. |
| 2007/0192586 A1 | 8/2007 | McNeely |
| 2008/0183992 A1 | 7/2008 | Martin et al. |
| 2008/0199003 A1 | 8/2008 | Hennessey et al. |
| 2008/0244277 A1 | 10/2008 | Orsini et al. |
| 2009/0077379 A1 | 3/2009 | Geyzel et al. |
| 2009/0097661 A1 | 4/2009 | Orsini et al. |

FOREIGN PATENT DOCUMENTS

| | | |
|---|---|---|
| EP | 0485090 A2 | 5/1992 |
| EP | 636259 | 2/1995 |
| EP | 793367 | 9/1997 |
| EP | 0821504 | 1/1998 |
| EP | 0862301 | 9/1998 |
| EP | 1011222 | 6/2000 |
| EP | 1239384 A2 | 9/2002 |
| GB | 2237670 A | 5/1991 |
| JP | 04297157 A | 10/1992 |
| RU | 2124814 | 1/1999 |
| WO | WO-98/47091 A1 | 10/1998 |
| WO | WO-99/19845 A1 | 4/1999 |
| WO | WO-99/46720 A1 | 9/1999 |
| WO | WO-99/65207 A1 | 12/1999 |
| WO | WO-00/36786 A1 | 6/2000 |
| WO | WO-00/76118 A1 | 12/2000 |
| WO | WO-00/79367 A1 | 12/2000 |
| WO | WO-01/22201 A1 | 3/2001 |
| WO | WO-01/22319 A1 | 3/2001 |
| WO | WO-01/22322 A2 | 3/2001 |
| WO | WO-01/22650 A2 | 3/2001 |
| WO | WO-01/22651 A2 | 3/2001 |
| WO | WO-02/21283 A1 | 3/2002 |
| WO | WO-02/21761 A2 | 3/2002 |

OTHER PUBLICATIONS

Cachin, "On-Line secret Sharing," Cryptography and Coding. IMA Conference, Proceedings, Dec. 18, 1995, pp. 190-198, XP002137681.

Chan et. al., "Distributed Server Networks for Secure Multicast", GLOBCOM'01: IEEE Global Telecommunications Conference (IEEE, Piscataway, NJ) 3:1974-1978 (2001).

Chan et. al., "Distributed Servers Approach for Large-Scale Multicast", IEEE Journal on Selected Areas in Communications (IEEE, Piscataway, NJ) Oct. 2002, 20(8):1500-1510.

Crescenzo et al., "Non-Interactive and Non-Malleable Commitment," Proceedings of the 30th Annual ACM Symposium on Theory of Computing. Dallas, TX, May 23-26, 1998, [Proceedings of the 30th Annual ACM Symposium on Theory of Computing], New York, NY: ACM, US, pp. 141-150; XP000970902; ISBN: 978-0-89791-962-3.

Damgard et. al., "Non-interactive and Reusable Non-malleable Commitment Schemes," ACM STOC '03; pp. 427-428; Jun. 9-11, 2003.

Decru Unveils Security Appliances for Storage Networks; Decru DataFort (TM) Security Alliances Protect SAN and NAS Environments with Wire-Speed Encryption and Transparent Deployment, PR Newswire (PR Newswire Association. Inc.), Oct. 14, 2002.

Doyle, "RSA Splits Data to Stop Hackers", vnunet.com, Apr. 16, 2003.

Fisher, "RSA Looks to Lock Down Personal Data", eWeek—Enterprise News & Reviews, Apr. 14, 2003.

Garay et. al., "Secure distributed storage and retrieval," Theoretical Comput. Sci., 243(1-2):363-389, Jul. 2000.

Gibson, "Opinion", eWeek—Enterprise News & Reviews, Apr. 14, 2003.

Grant et. al., "Secret Sharing and Splitting", (White Paper) Notre Dame, Indiana, Dec. 16, 2002.

Hunter, "Simplifying PKI Usage Through a Client-Server Architecture and Dynamic Propagation of Certificate Paths and Repository Addresses", Proceedings 13th International Workshop on Database and Expert Systems Applications (IEEE Computer Soc., Los Alamitos, CA), Sep. 2-6, 2002, p. 505-510.

International Search Report—International Application No. PCT/US06/45066, dated Jul. 17, 2008.

International Search Report dated Dec. 16, 2008, International Application No. PCT/US07/023626.

Krawczyk, "Distributed Fingerprints and Secure Information Dispersal," 12$^{th}$ ACM, Symposium on Principles on Distributed Computing, Ithaca, NY, ACM 0-89191-613-1/93/0008/0207, 1993, pp. 207-218.

(56) References Cited

OTHER PUBLICATIONS

Lancope Announces Stealthwatch 3.0 for Enhanced Enterprise-Wide Security and Improved Manageability, Business Wire (Newswire Association, Inc.), Apr. 14, 2003.
Loutrel et. al. "An EAP-BT Smartcard for Authentication in the Next Generation of Wireless Communications", Conference on Network Control and Engineering for QoS Security and Mobility (Kluwer Academic Publishers, Norwell, MA) Oct. 23-25, 2002, pp. 1-4-114.
Mayer et. al., "Generalized Secret Sharing and Group-Key Distribution Using Short Keys," Compression and Complexity of Sequences 1997, Proceedings Salerno, Italy, Jun. 11-13, 1997, Los Alamitos, CA, USA, IEEE Comput,. Soc, US, Jun. 11, 1997, pp. 30-44, XP010274905, ISBN: 978-0-8186-8132-5.
McNamara, "Strong Crypto Freeware" (Secret Sharer Version 1.0) Jul. 11, 1995.
Myers et. al., "A secure, publisher-centric Web caching infrastructure" In: INFOCOM 2001 Proceedings. IEEE Twentieth Annual Joint Conference of the IEEE Computer and Communications Societies [online], vol. 3 p. 1235-1243. Published Apr. 22, 2001. [retrieved on Jul. 8, 2008]. Retrieved from the internet <URL:http://people.ischool.berekeley.edu/-chuang/pubs/gemini.pdf>.
Nightingale, The New Secret-Splitting Technology from RSA . . . NGBK DS 0403 http://developer.rsasecurity.com/labs/nightingale/developer.rsasecurity.com/labs/nightingale/files/nightingale-brochure.pdf, Apr. 13, 2003.
Rabin, "Efficient Dispersal of Information for Security, Load Balancing and Fault Tolerance," Journal of the Association for Computing Machinery, vol. 36, No. 2, pp. 335-348, Apr. 1989.
RSA SureFile: Software Powered by PKZIP . . . BSSF DS 0103 Authorized Reseller: Technical Specifications Platforms Microsoft® Windows® 98 Second Edition ME NT 4.0 Workstation SP6A 2000 Professional SP2 . . . www.rsasecurity.com/products/bsafe/datasheets/BSSF_DS_103.pdf, Apr. 17, 2003.
Savage, "RSA Unveils Nightingale Technology", CRN.com, Apr. 14, 2003.
Shamir, "How to Share a Secret," Communications of the Association for Computing Machinery, ACM, New York, NY, US, vol. 22, No. 11, Nov. 1, 1979, pp. 1-4, XP002241399; ISSN: 0001-0782.
Shin et. al., "Design a Working Model of Secure Data Transfer Using a Data Mart", Proceedings of the ISCA 14th International Conference Computer Applications in Industry and Engineering (ISCA, Cary, NC) Nov. 27-29, 2001, p. 66-69.
Tactilesense TM White Paper—A Breakthrough in Fingerprint Authentication, Ethentica, Inc. by Security First Corporation, Jan. 2003.
Trustengine TM White Paper—Enthentication Services, Secure Storage and Authentication Solutions, Ethentica, Inc. by Security First Corporation, Jun. 2002.
Vijayan, "RSA unveils Management, Encryption Products", Computerworld, Apr. 15, 2003.
Waldman et al., "Publius: A robust, tamper-evident, censorship-resistant web publishing sytem," Proceedings of the $9^{th}$ USENIX Security Symposum, Aug. 2000.
Waters, "RSA Integrates ID Management; discloses 'Nightingale' ", ADTmag.com, Apr. 21, 2003.

* cited by examiner

SYSTEMS AND METHODS FOR DISTRIBUTING AND SECURING DATA

CROSS-REFERENCE TO RELATED APPLICATIONS

This application is a continuation of U.S. patent application Ser. No. 11/983,355, filed on Nov. 7, 2007, which claims the benefit of U.S. provisional application No. 60/857,345, filed on Nov. 7, 2006, each of which is hereby incorporated by reference herein in its entirety.

FIELD OF THE INVENTION

The present invention relates in general to a system for securing data from unauthorized access or use. The present invention also relates generally to cryptographic techniques for the construction of secret sharing schemes, and more particularly to systems and methods for supporting a secret sharing scheme that can tolerate damage to one or more shares.

BACKGROUND OF THE INVENTION

In today's society, individuals and businesses conduct an ever-increasing amount of activities on and over computer systems. These computer systems, including proprietary and non-proprietary computer networks, are often storing, archiving, and transmitting all types of sensitive information. Thus, an ever-increasing need exists for ensuring data stored and transmitted over these systems cannot be read or otherwise compromised.

One common solution for securing computer systems is to provide login and password functionality. However, password management has proven to be quite costly with a large percentage of help desk calls relating to password issues. Moreover, passwords provide little security in that they are generally stored in a file susceptible to inappropriate access, through, for example, brute-force attacks.

Another solution for securing computer systems is to provide cryptographic infrastructures. Cryptography, in general, refers to protecting data by transforming, or encrypting, it into an unreadable format. Only those who possess the key(s) to the encryption can decrypt the data into a useable format. Cryptography is used to identify users, e.g., authentication, to allow access privileges, e.g., authorization, to create digital certificates and signatures, and the like. One popular cryptography system is a public key system that uses two keys, a public key known to everyone and a private key known only to the individual or business owner thereof. Generally, the data encrypted with one key is decrypted with the other and neither key is recreatable from the other.

Unfortunately, even the foregoing typical public-key cryptographic systems are still highly reliant on the user for security. For example, cryptographic systems issue the private key to the user, for example, through the user's browser. Unsophisticated users then generally store the private key on a hard drive accessible to others through an open computer system, such as, for example, the Internet. On the other hand, users may choose poor names for files containing their private key, such as, for example, "key." The result of the foregoing and other acts is to allow the key or keys to be susceptible to compromise.

In addition to the foregoing compromises, a user may save his or her private key on a computer system configured with an archiving or backup system, potentially resulting in copies of the private key traveling through multiple computer storage devices or other systems. This security breach is often referred to as "key migration." Similar to key migration, many applications provide access to a user's private key through, at most, simple login and password access. As mentioned in the foregoing, login and password access often does not provide adequate security.

One solution for increasing the security of the foregoing cryptographic systems is to include biometrics as part of the authentication or authorization. Biometrics generally include measurable physical characteristics, such as, for example, finger prints or speech that can be checked by an automated system, such as, for example, pattern matching or recognition of finger print patterns or speech patterns. In such systems, a user's biometric and/or keys may be stored on mobile computing devices, such as, for example, a smartcard, laptop, personal digital assistant, or mobile phone, thereby allowing the biometric or keys to be usable in a mobile environment.

The foregoing mobile biometric cryptographic system still suffers from a variety of drawbacks. For example, the mobile user may lose or break the smartcard or portable computing device, thereby having his or her access to potentially important data entirely cut-off. Alternatively, a malicious person may steal the mobile user's smartcard or portable computing device and use it to effectively steal the mobile user's digital credentials. On the other hand, the portable-computing device may be connected to an open system, such as the Internet, and, like passwords, the file where the biometric is stored may be susceptible to compromise through user inattentiveness to security or malicious intruders.

One way to secure data from unauthorized access or unauthorized use is to use a secret sharing scheme. A secret sharing scheme is a method to split a sensitive piece of data (e.g., confidential files, an encryption key, or any type of communication), sometimes called the secret, into a collection of pieces, called shares, such that that possession of a sufficient number of shares enables recovery of the secret, but possession of an insufficient number of shares provides little or no information about the secret that was shared. Such schemes are important tools in cryptography and information security.

Formally, a secret sharing scheme consists of a pair of algorithms, the sharing algorithm Share and the recovery algorithm Recover. The sharing algorithm is typically probabilistic (meaning that it makes randomized choices), and the recovery algorithm is typically deterministic. The sharing algorithm may be used to disassemble, or split, the secret into a collection of shares, and the recovery algorithm may be used to reassemble those shares. At reassembly time, each share may be present, in which case a string may be provided to the recovery algorithm, or a share may be missing, in which case a designated value (referred to as "$\Diamond$" herein) may be provided to the recovery algorithm. A set of players that is authorized to recover the secret is called an authorized set, and the set of all such players is sometimes called an access structure.

Secret sharing schemes have been designed to work on various access structures, but the most common access structure is a threshold access structure, where any subset of m or more players, out of a total of n players in all, are said to be authorized. A secret sharing scheme for a threshold access structure is sometimes called a threshold scheme. There are two security properties for any secret sharing scheme: a privacy property and a recoverability property. The privacy property ensures that unauthorized coalitions of players do not learn anything useful about the secret. The recoverability property ensures that authorized coalitions of players can ultimately recover the underlying secret.

Shamir's secret sharing scheme is said to be a perfect secret sharing (PSS) scheme. The term "perfect" refers to the privacy guarantee being information theoretic and without any error; thus, unauthorized coalitions of players may learn nothing useful about the underlying secret in PSS schemes.

One limitation with PSS schemes is that the size of each share must be at least as long as the size of the secret that is being shared. When the secret includes a large file or long string of characters, however, this limitation can become unwieldy, increasing overall complexity of the system. In response to this limitation, schemes for computational secret sharing (CSS) have been developed.

Krawczyk's CSS scheme, for example, permits the shares to be shorter than the secret. For example, in a 2-out-of-3 threshold scheme (meaning that any two of three shares are adequate for recovering the secret), the secret S can be divided into shares of size about |S|/2 bits, where |S| denotes the length of S. Shares this short are not possible in the PSS setting. In CSS schemes, however, the privacy property may no longer be absolute and information theoretic; rather, an unauthorized coalition of players may obtain a small amount of information about the shared secret from their shares. But, under a computational complexity assumption, the amount of information will be negligible and therefore, in practice, not much of a concern.

A second limitation of PSS schemes concerns the lack of mandated robustness. Robustness means that a faulty or adversarial participant is unable to force the recovery of an incorrect secret. The model for PSS assumes that each share is either "correct" or "missing", but it may never be wrong (e.g., corrupt or intentional altered). In practice, this is a highly unreasonable assumption because shares may be wrong due to any number of factors, including, for example, errors in storage, noise in a communications channel, or due to genuinely adversarial activities. In addition, the lack of robustness is not just a theoretical possibility, but a genuine problem for typical PSS schemes, including Shamir's secret sharing scheme. With Shamir's scheme, an adversary can in fact force the recovery of any desired secret by appropriately changing just one share. Practical applications of secret sharing schemes typically require robustness.

SUMMARY OF THE INVENTION

Based on the foregoing, robust computational secret sharing schemes that are simultaneously efficient and have strong provable-security properties under weak cryptographic assumptions are needed.

Accordingly, one aspect of the present invention is to provide a method for securing virtually any type of data from unauthorized access or use. The method comprises one or more steps of parsing, splitting and/or separating the data to be secured into two or more parts or portions. The method also comprises encrypting the data to be secured. Encryption of the data may be performed prior to or after the first parsing, splitting and/or separating of the data. In addition, the encrypting step may be repeated for one or more portions of the data. Similarly, the parsing, splitting and/or separating steps may be repeated for one or more portions of the data. The method also optionally comprises storing the parsed, split and/or separated data that has been encrypted in one location or in multiple locations. This method also optionally comprises reconstituting or re-assembling the secured data into its original form for authorized access or use. This method may be incorporated into the operations of any computer, server, engine or the like, that is capable of executing the desired steps of the method.

Another aspect of the present invention provides a system for securing virtually any type of data from unauthorized access or use. This system comprises a data splitting module, a cryptographic handling module, and, optionally, a data assembly module. The system may, in one embodiment, further comprise one or more data storage facilities where secure data may be stored.

Another aspect of the invention includes using any suitable parsing and splitting algorithm to generate shares of data. Either random, pseudo-random, deterministic, or any combination thereof may be employed for parsing and splitting data.

In yet other embodiments, an n-party secret sharing scheme with message space S is provided. A family of adversaries, A, may be defined. The n-party secret sharing scheme may include one or more of the following five primitives: (1) a symmetric encryption algorithm with k-bit keys and message space S; (2) an n-party PSS algorithm over adversaries A with a message space $\{0,1\}^k$; (3) an n-party information dispersal algorithm (IDA); (4) an n-party error correction code (ECC) over adversaries A with a message space $\{0,1\}^h$; and (5) a randomized (or probabilistic) commitment scheme. Data may be secured by first applying a computational secret sharing algorithm to the data to be secured. A random or pseudo-random value may then be generated. From the output of the secret sharing algorithm and the random or pseudo-random value, a set of committal values and decommital values may be computed. A plurality of shares may then be formed by combining a share output from the secret sharing algorithm, a decommittal value, and one or more committal values. The shares may then be stored at one or more physical locations (e.g., on a magnetic hard disk drive), or one or more geographic locations (e.g., different data repositories or servers).

In some embodiments, a probabilistic commitment scheme may be used to compute the set of committal values and a set of decommittal values. Each share may be defined by a share output from a computational secret sharing algorithm, a decommittal value, and one or more committal values from the set of committal values.

In some embodiments, a cryptographic key may be generated and used to encrypt user data to create a ciphertext portion. A set of n key shares may be created by applying a secret sharing algorithm to the cryptographic key. A set of n ciphertext chunks may then be created by applying an information dispersal algorithm (IDA) to the ciphertext. A set of n committal values and n decommittal values may be computed by applying a probabilistic commitment scheme to each of the n key shares and ciphertext chunks. N data fragments may be formed, where each data fragment may be a function of a key share, a ciphertext, a decommittal value, and one or more committal values. Finally, the data fragments may be stored on one or more logical storage devices (e.g., n logical storage devices). One or more of these logical storage devices may be situated at different geographic or physical locations. The user data may then be reconstituted by combining at least a predefined number of data fragments. In some embodiments, various error-correcting codes may be used to provide an adequate collection of committal values for each player.

BRIEF DESCRIPTION OF THE DRAWINGS

The present invention is described in more detail below in connection with the attached drawings, which are meant to illustrate and not to limit the invention, and in which.

DETAILED DESCRIPTION OF THE INVENTION

One aspect of the present invention is to provide a cryptographic system where one or more secure servers, or a trust engine, stores cryptographic keys and user authentication data. Users access the functionality of conventional cryptographic systems through network access to the trust engine, however, the trust engine does not release actual keys and other authentication data and therefore, the keys and data remain secure. This server-centric storage of keys and authentication data provides for user-independent security, portability, availability, and straightforwardness.

Because users can be confident in, or trust, the cryptographic system to perform user and document authentication and other cryptographic functions, a wide variety of functionality may be incorporated into the system. For example, the trust engine provider can ensure against agreement repudiation by, for example, authenticating the agreement participants, digitally signing the agreement on behalf of or for the participants, and storing a record of the agreement digitally signed by each participant. In addition, the cryptographic system may monitor agreements and determine to apply varying degrees of authentication, based on, for example, price, user, vendor, geographic location, place of use, or the like.

To facilitate a complete understanding of the invention, the remainder of the detailed description describes the invention with reference to the figures, wherein like elements are referenced with like numerals throughout.

Figure 1:
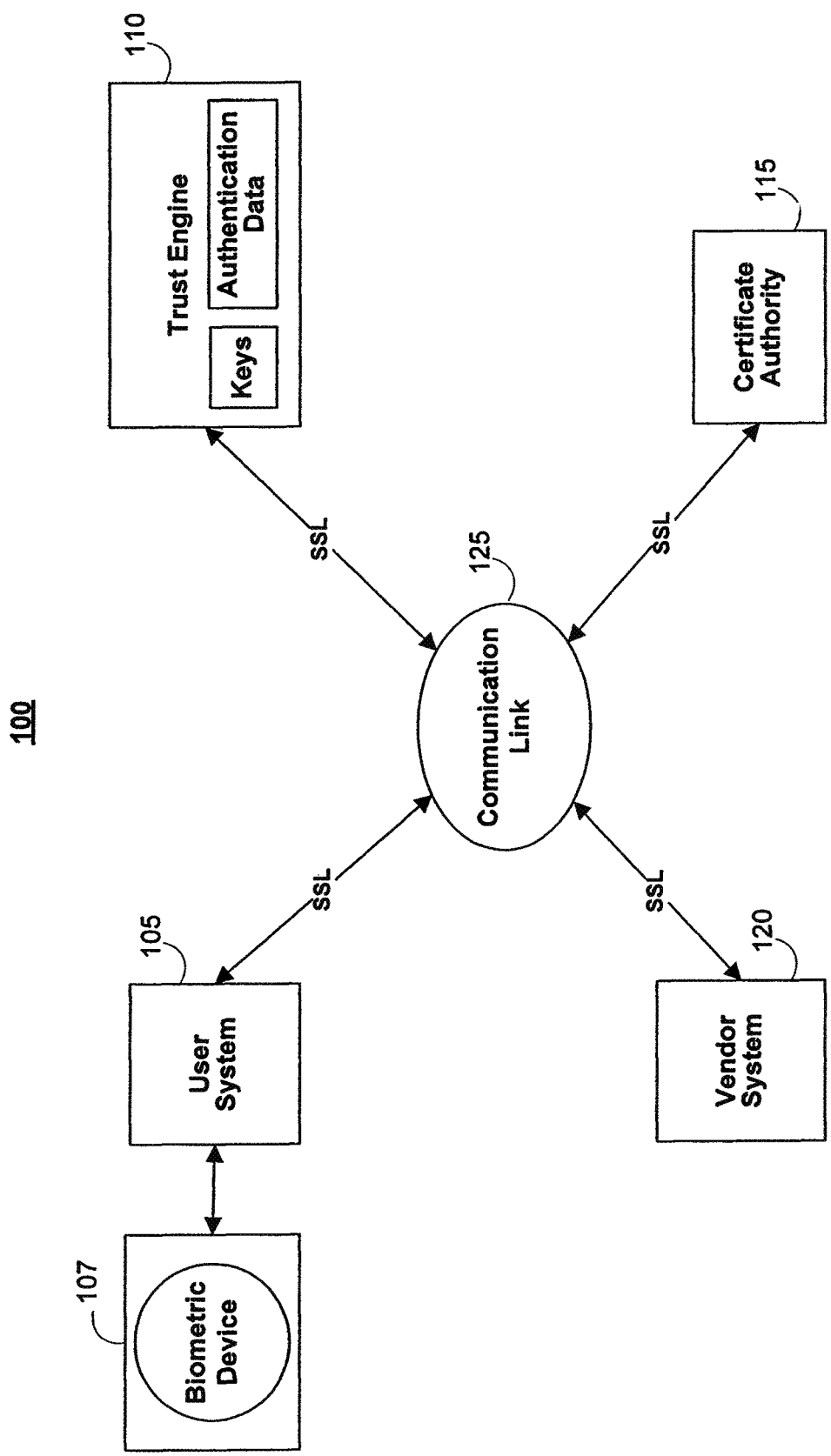
FIG. 1 illustrates a block diagram of a cryptographic system, according to aspects of an embodiment of the invention.

FIG. 1 illustrates a block diagram of a cryptographic system 100, according to aspects of an embodiment of the invention. As shown in FIG. 1, the cryptographic system 100 includes a user system 105, a trust engine 110, a certificate authority 115, and a vendor system 120, communicating through a communication link 125.

According to one embodiment of the invention, the user system 105 comprises a conventional general-purpose computer having one or more microprocessors, such as, for example, an Intel-based processor. Moreover, the user system 105 includes an appropriate operating system, such as, for example, an operating system capable of including graphics or windows, such as Windows, Unix, Linux, or the like. As shown in FIG. 1, the user system 105 may include a biometric device 107. The biometric device 107 may advantageously capture a user's biometric and transfer the captured biometric to the trust engine 110. According to one embodiment of the invention, the biometric device may advantageously comprise a device having attributes and features similar to those disclosed in U.S. patent application Ser. No. 08/926,277, filed on Sep. 5, 1997, entitled "RELIEF OBJECT IMAGE GENERATOR," U.S. patent application Ser. No. 09/558,634, filed on Apr. 26, 2000, entitled "IMAGING DEVICE FOR A RELIEF OBJECT AND SYSTEM AND METHOD OF USING THE IMAGE DEVICE," U.S. patent application Ser. No. 09/435,011, filed on Nov. 5, 1999, entitled "RELIEF OBJECT SENSOR ADAPTOR," and U.S. patent application Ser. No. 09/477,943, filed on Jan. 5, 2000, entitled "PLANAR OPTICAL IMAGE SENSOR AND SYSTEM FOR GENERATING AN ELECTRONIC IMAGE OF A RELIEF OBJECT FOR FINGERPRINT READING," all of which are owned by the instant assignee, and all of which are hereby incorporated by reference herein.

In addition, the user system 105 may connect to the communication link 125 through a conventional service provider, such as, for example, a dial up, digital subscriber line (DSL), cable modem, fiber connection, or the like. According to another embodiment, the user system 105 connects the communication link 125 through network connectivity such as, for example, a local or wide area network. According to one embodiment, the operating system includes a TCP/IP stack that handles all incoming and outgoing message traffic passed over the communication link 125.

Although the user system 105 is disclosed with reference to the foregoing embodiments, the invention is not intended to be limited thereby. Rather, a skilled artisan will recognize from the disclosure herein, a wide number of alternatives embodiments of the user system 105, including almost any computing device capable of sending or receiving information from another computer system. For example, the user system 105 may include, but is not limited to, a computer workstation, an interactive television, an interactive kiosk, a personal mobile computing device, such as a digital assistant, mobile phone, laptop, or the like, a wireless communications device, a smartcard, an embedded computing device, or the like, which can interact with the communication link 125. In such alternative systems, the operating systems will likely differ and be adapted for the particular device. However, according to one embodiment, the operating systems advantageously continue to provide the appropriate communications protocols needed to establish communication with the communication link 125.

FIG. 1 illustrates the trust engine 110. According to one embodiment, the trust engine 110 comprises one or more secure servers for accessing and storing sensitive information, which may be any type or form of data, such as, but not limited to text, audio, video, user authentication data and public and private cryptographic keys. According to one embodiment, the authentication data includes data designed to uniquely identify a user of the cryptographic system 100. For example, the authentication data may include a user identification number, one or more biometrics, and a series of questions and answers generated by the trust engine 110 or the user, but answered initially by the user at enrollment. The foregoing questions may include demographic data, such as place of birth, address, anniversary, or the like, personal data, such as mother's maiden name, favorite ice cream, or the like, or other data designed to uniquely identify the user. The trust engine 110 compares a user's authentication data associated with a current transaction, to the authentication data provided at an earlier time, such as, for example, during enrollment. The trust engine 110 may advantageously require the user to produce the authentication data at the time of each transaction, or, the trust engine 110 may advantageously allow the user to periodically produce authentication data, such as at the beginning of a string of transactions or the logging onto a particular vendor website.

According to the embodiment where the user produces biometric data, the user provides a physical characteristic, such as, but not limited to, facial scan, hand scan, ear scan, iris scan, retinal scan, vascular pattern, DNA, a fingerprint, writing or speech, to the biometric device 107. The biometric device advantageously produces an electronic pattern, or biometric, of the physical characteristic. The electronic pattern is transferred through the user system 105 to the trust engine 110 for either enrollment or authentication purposes.

Once the user produces the appropriate authentication data and the trust engine 110 determines a positive match between that authentication data (current authentication data) and the authentication data provided at the time of enrollment (enrollment authentication data), the trust engine 110 provides the user with complete cryptographic functionality. For example, the properly authenticated user may advantageously employ the trust engine 110 to perform hashing, digitally signing, encrypting and decrypting (often together referred to only as encrypting), creating or distributing digital certificates, and the like. However, the private cryptographic keys used in the cryptographic functions will not be available outside the trust engine 110, thereby ensuring the integrity of the cryptographic keys.

According to one embodiment, the trust engine 110 generates and stores cryptographic keys. According to another embodiment, at least one cryptographic key is associated with each user. Moreover, when the cryptographic keys include public-key technology, each private key associated with a user is generated within, and not released from, the trust engine 110. Thus, so long as the user has access to the trust engine 110, the user may perform cryptographic functions using his or her private or public key. Such remote access advantageously allows users to remain completely mobile and access cryptographic functionality through practically any Internet connection, such as cellular and satellite phones, kiosks, laptops, hotel rooms and the like.

According to another embodiment, the trust engine 110 performs the cryptographic functionality using a key pair generated for the trust engine 110. According to this embodiment, the trust engine 110 first authenticates the user, and after the user has properly produced authentication data matching the enrollment authentication data, the trust engine 110 uses its own cryptographic key pair to perform cryptographic functions on behalf of the authenticated user.

A skilled artisan will recognize from the disclosure herein that the cryptographic keys may advantageously include some or all of symmetric keys, public keys, and private keys. In addition, a skilled artisan will recognize from the disclosure herein that the foregoing keys may be implemented with a wide number of algorithms available from commercial technologies, such as, for example, RSA, ELGAMAL, or the like.

FIG. 1 also illustrates the certificate authority 115. According to one embodiment, the certificate authority 115 may advantageously comprise a trusted third-party organization or company that issues digital certificates, such as, for example, VeriSign, Baltimore, Entrust, or the like. The trust engine 110 may advantageously transmit requests for digital certificates, through one or more conventional digital certificate protocols, such as, for example, PKCS10, to the certificate authority 115. In response, the certificate authority 115 will issue a digital certificate in one or more of a number of differing protocols, such as, for example, PKCS7. According to one embodiment of the invention, the trust engine 110 requests digital certificates from several or all of the prominent certificate authorities 115 such that the trust engine 110 has access to a digital certificate corresponding to the certificate standard of any requesting party.

According to another embodiment, the trust engine 110 internally performs certificate issuances. In this embodiment, the trust engine 110 may access a certificate system for generating certificates and/or may internally generate certificates when they are requested, such as, for example, at the time of key generation or in the certificate standard requested at the time of the request. The trust engine 110 will be disclosed in greater detail below.

FIG. 1 also illustrates the vendor system 120. According to one embodiment, the vendor system 120 advantageously comprises a Web server. Typical Web servers generally serve content over the Internet using one of several Internet markup languages or document format standards, such as the Hyper-Text Markup Language (HTML) or the Extensible Markup Language (XML). The Web server accepts requests from browsers like Netscape and Internet Explorer and then returns the appropriate electronic documents. A number of server or client-side technologies can be used to increase the power of the Web server beyond its ability to deliver standard electronic documents. For example, these technologies include Common Gateway Interface (CGI) scripts, Secure Sockets Layer (SSL) security, and Active Server Pages (ASPs). The vendor system 120 may advantageously provide electronic content relating to commercial, personal, educational, or other transactions.

Although the vendor system 120 is disclosed with reference to the foregoing embodiments, the invention is not intended to be limited thereby. Rather, a skilled artisan will recognize from the disclosure herein that the vendor system 120 may advantageously comprise any of the devices described with reference to the user system 105 or combination thereof.

FIG. 1 also illustrates the communication link 125 connecting the user system 105, the trust engine 110, the certificate authority 115, and the vendor system 120. According to one embodiment, the communication link 125 preferably comprises the Internet. The Internet, as used throughout this disclosure is a global network of computers. The structure of the Internet, which is well known to those of ordinary skill in the art, includes a network backbone with networks branching from the backbone. These branches, in turn, have networks branching from them, and so on. Routers move information packets between network levels, and then from network to network, until the packet reaches the neighborhood of its destination. From the destination, the destination network's host directs the information packet to the appropriate terminal, or node. In one advantageous embodiment, the Internet routing hubs comprise domain name system (DNS) servers using Transmission Control Protocol/Internet Protocol (TCP/IP) as is well known in the art. The routing hubs connect to one or more other routing hubs via high-speed communication links.

One popular part of the Internet is the World Wide Web. The World Wide Web contains different computers, which store documents capable of displaying graphical and textual information. The computers that provide information on the World Wide Web are typically called "websites." A website is defined by an Internet address that has an associated electronic page. The electronic page can be identified by a Uniform Resource Locator (URL). Generally, an electronic page is a document that organizes the presentation of text, graphical images, audio, video, and so forth.

Although the communication link 125 is disclosed in terms of its preferred embodiment, one of ordinary skill in the art will recognize from the disclosure herein that the communication link 125 may include a wide range of interactive communications links. For example, the communication link 125 may include interactive television networks, telephone networks, wireless data transmission systems, two-way cable systems, customized private or public computer networks, interactive kiosk networks, automatic teller machine networks, direct links, satellite or cellular networks, and the like.

Figure 2:
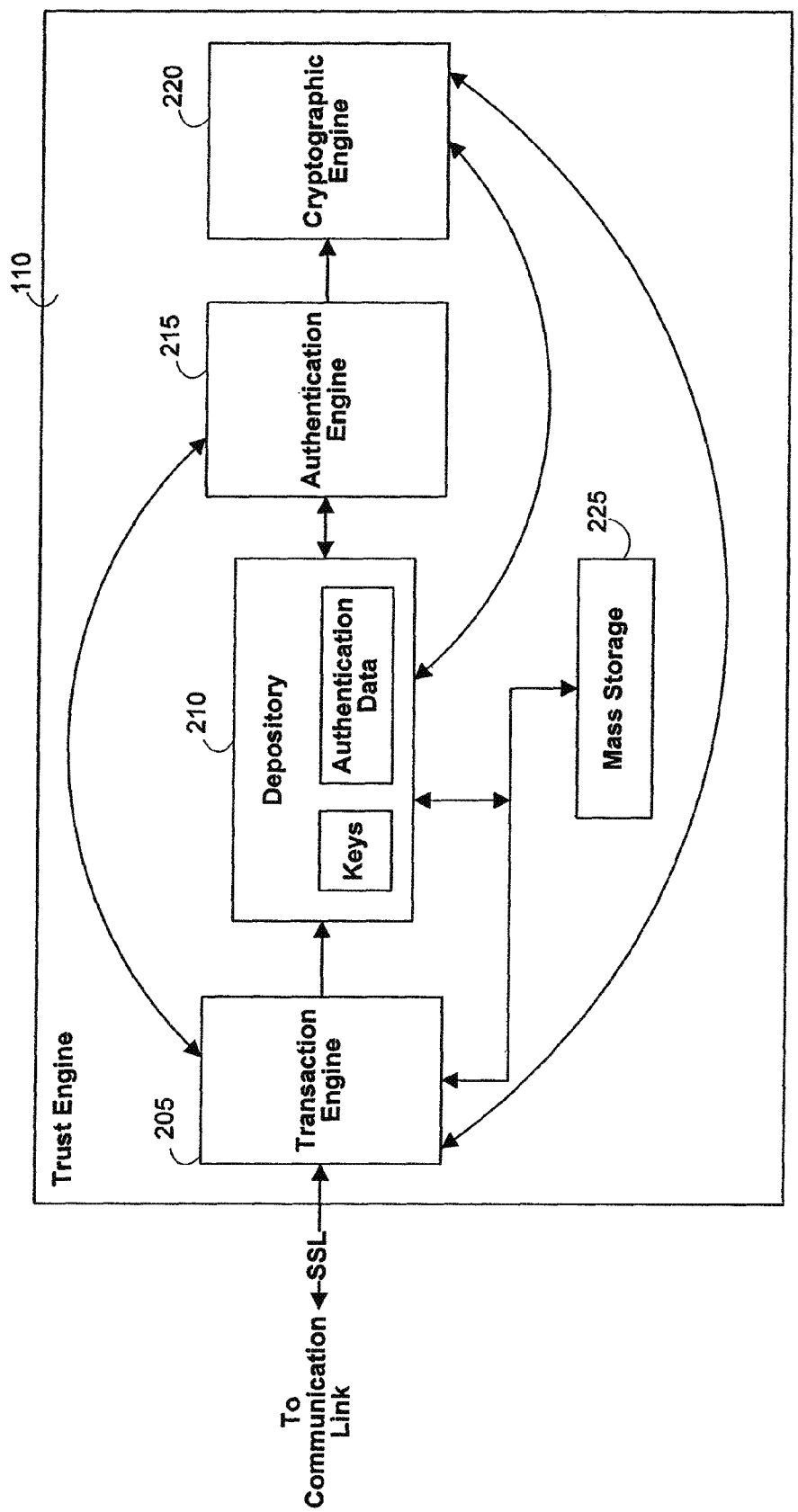
FIG. 2 illustrates a block diagram of the trust engine of FIG. 1, according to aspects of an embodiment of the invention.

FIG. 2 illustrates a block diagram of the trust engine 110 of FIG. 1 according to aspects of an embodiment of the invention. As shown in FIG. 2, the trust engine 110 includes a transaction engine 205, a depository 210, an authentication engine 215, and a cryptographic engine 220. According to one embodiment of the invention, the trust engine 110 also includes mass storage 225. As further shown in FIG. 2, the transaction engine 205 communicates with the depository 210, the authentication engine 215, and the cryptographic engine 220, along with the mass storage 225. In addition, the depository 210 communicates with the authentication engine 215, the cryptographic engine 220, and the mass storage 225. Moreover, the authentication engine 215 communicates with the cryptographic engine 220. According to one embodiment of the invention, some or all of the foregoing communications may advantageously comprise the transmission of XML documents to IP addresses that correspond to the receiving device. As mentioned in the foregoing, XML documents advantageously allow designers to create their own customized document tags, enabling the definition, transmission, validation, and interpretation of data between applications and between organizations. Moreover, some or all of the foregoing communications may include conventional SSL technologies.

According to one embodiment, the transaction engine 205 comprises a data routing device, such as a conventional Web server available from Netscape, Microsoft, Apache, or the like. For example, the Web server may advantageously receive incoming data from the communication link 125. According to one embodiment of the invention, the incoming data is addressed to a front-end security system for the trust engine 110. For example, the front-end security system may advantageously include a firewall, an intrusion detection system searching for known attack profiles, and/or a virus scanner. After clearing the front-end security system, the data is received by the transaction engine 205 and routed to one of the depository 210, the authentication engine 215, the cryptographic engine 220, and the mass storage 225. In addition, the transaction engine 205 monitors incoming data from the authentication engine 215 and cryptographic engine 220, and routes the data to particular systems through the communication link 125. For example, the transaction engine 205 may advantageously route data to the user system 105, the certificate authority 115, or the vendor system 120.

According to one embodiment, the data is routed using conventional HTTP routing techniques, such as, for example, employing URLs or Uniform Resource Indicators (URIs). URIs are similar to URLs, however, URIs typically indicate the source of files or actions, such as, for example, executables, scripts, and the like. Therefore, according to the one embodiment, the user system 105, the certificate authority 115, the vendor system 120, and the components of the trust engine 210, advantageously include sufficient data within communication URLs or URIs for the transaction engine 205 to properly route data throughout the cryptographic system.

Although the data routing is disclosed with reference to its preferred embodiment, a skilled artisan will recognize a wide number of possible data routing solutions or strategies. For example, XML or other data packets may advantageously be unpacked and recognized by their format, content, or the like, such that the transaction engine 205 may properly route data throughout the trust engine 110. Moreover, a skilled artisan will recognize that the data routing may advantageously be adapted to the data transfer protocols conforming to particular network systems, such as, for example, when the communication link 125 comprises a local network.

According to yet another embodiment of the invention, the transaction engine 205 includes conventional SSL encryption technologies, such that the foregoing systems may authenticate themselves, and vise-versa, with transaction engine 205, during particular communications. As will be used throughout this disclosure, the term "½ SSL" refers to communications where a server but not necessarily the client, is SSL authenticated, and the term "FULL SSL" refers to communications where the client and the server are SSL authenticated. When the instant disclosure uses the term "SSL", the communication may comprise ½ or FULL SSL.

As the transaction engine 205 routes data to the various components of the cryptographic system 100, the transaction engine 205 may advantageously create an audit trail. According to one embodiment, the audit trail includes a record of at least the type and format of data routed by the transaction engine 205 throughout the cryptographic system 100. Such audit data may advantageously be stored in the mass storage 225.

FIG. 2 also illustrates the depository 210. According to one embodiment, the depository 210 comprises one or more data storage facilities, such as, for example, a directory server, a database server, or the like. As shown in FIG. 2, the depository 210 stores cryptographic keys and enrollment authentication data. The cryptographic keys may advantageously correspond to the trust engine 110 or to users of the cryptographic system 100, such as the user or vendor. The enrollment authentication data may advantageously include data designed to uniquely identify a user, such as, user ID, passwords, answers to questions, biometric data, or the like. This enrollment authentication data may advantageously be acquired at enrollment of a user or another alternative later time. For example, the trust engine 110 may include periodic or other renewal or reissue of enrollment authentication data.

According to one embodiment, the communication from the transaction engine 205 to and from the authentication engine 215 and the cryptographic engine 220 comprises secure communication, such as, for example conventional SSL technology. In addition, as mentioned in the foregoing, the data of the communications to and from the depository 210 may be transferred using URLs, URIs, HTTP or XML documents, with any of the foregoing advantageously having data requests and formats embedded therein.

As mentioned above, the depository 210 may advantageously comprises a plurality of secure data storage facilities. In such an embodiment, the secure data storage facilities may be configured such that a compromise of the security in one individual data storage facility will not compromise the cryptographic keys or the authentication data stored therein. For example, according to this embodiment, the cryptographic keys and the authentication data are mathematically operated on so as to statistically and substantially randomize the data stored in each data storage facility. According to one embodiment, the randomization of the data of an individual data storage facility renders that data undecipherable. Thus, compromise of an individual data storage facility produces only a randomized undecipherable number and does not compromise the security of any cryptographic keys or the authentication data as a whole.

FIG. 2 also illustrates the trust engine 110 including the authentication engine 215. According to one embodiment, the authentication engine 215 comprises a data comparator configured to compare data from the transaction engine 205 with data from the depository 210. For example, during authentication, a user supplies current authentication data to the trust engine 110 such that the transaction engine 205 receives the current authentication data. As mentioned in the foregoing, the transaction engine 205 recognizes the data requests, preferably in the URL or URI, and routes the authentication data to the authentication engine 215. Moreover, upon request, the depository 210 forwards enrollment authentication data corresponding to the user to the authentication engine 215. Thus, the authentication engine 215 has both the current authentication data and the enrollment authentication data for comparison.

According to one embodiment, the communications to the authentication engine comprise secure communications, such as, for example, SSL technology. Additionally, security can be provided within the trust engine 110 components, such as, for example, super-encryption using public key technologies. For example, according to one embodiment, the user encrypts the current authentication data with the public key of the authentication engine 215. In addition, the depository 210 also encrypts the enrollment authentication data with the public key of the authentication engine 215. In this way, only the authentication engine's private key can be used to decrypt the transmissions.

As shown in FIG. 2, the trust engine 110 also includes the cryptographic engine 220. According to one embodiment, the cryptographic engine comprises a cryptographic handling module, configured to advantageously provide conventional cryptographic functions, such as, for example, public-key infrastructure (PKI) functionality. For example, the cryptographic engine 220 may advantageously issue public and private keys for users of the cryptographic system 100. In this manner, the cryptographic keys are generated at the cryptographic engine 220 and forwarded to the depository 210 such that at least the private cryptographic keys are not available outside of the trust engine 110. According to another embodiment, the cryptographic engine 220 randomizes and splits at least the private cryptographic key data, thereby storing only the randomized split data. Similar to the splitting of the enrollment authentication data, the splitting process ensures the stored keys are not available outside the cryptographic engine 220. According to another embodiment, the functions of the cryptographic engine can be combined with and performed by the authentication engine 215.

According to one embodiment, communications to and from the cryptographic engine include secure communications, such as SSL technology. In addition, XML documents may advantageously be employed to transfer data and/or make cryptographic function requests.

FIG. 2 also illustrates the trust engine 110 having the mass storage 225. As mentioned in the foregoing, the transaction engine 205 keeps data corresponding to an audit trail and stores such data in the mass storage 225. Similarly, according to one embodiment of the invention, the depository 210 keeps data corresponding to an audit trail and stores such data in the mass storage device 225. The depository audit trail data is similar to that of the transaction engine 205 in that the audit trail data comprises a record of the requests received by the depository 210 and the response thereof. In addition, the mass storage 225 may be used to store digital certificates having the public key of a user contained therein.

Although the trust engine 110 is disclosed with reference to its preferred and alternative embodiments, the invention is not intended to be limited thereby. Rather, a skilled artisan will recognize in the disclosure herein, a wide number of alternatives for the trust engine 110. For example, the trust engine 110, may advantageously perform only authentication, or alternatively, only some or all of the cryptographic functions, such as data encryption and decryption. According to such embodiments, one of the authentication engine 215 and the cryptographic engine 220 may advantageously be removed, thereby creating a more straightforward design for the trust engine 110. In addition, the cryptographic engine 220 may also communicate with a certificate authority such that the certificate authority is embodied within the trust engine 110. According to yet another embodiment, the trust engine 110 may advantageously perform authentication and one or more cryptographic functions, such as, for example, digital signing.

Figure 3:
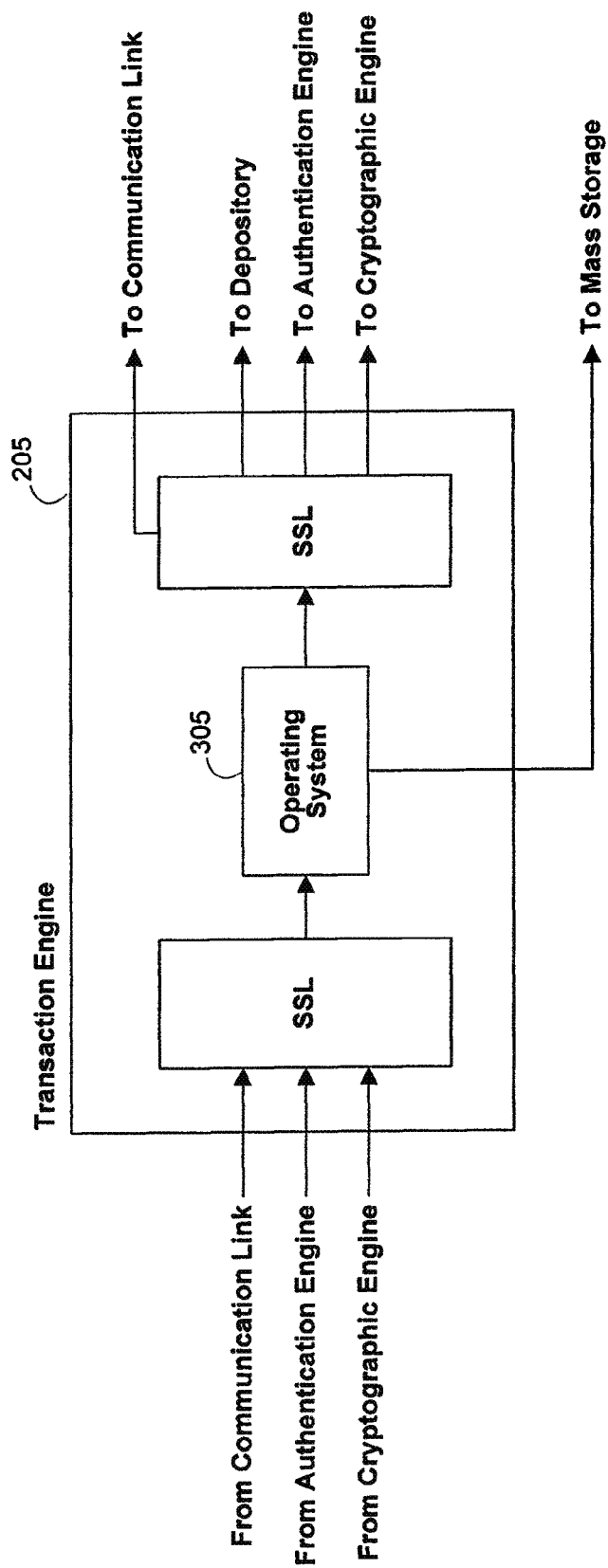
FIG. 3 illustrates a block diagram of the transaction engine of FIG. 2, according to aspects of an embodiment of the invention.

FIG. 3 illustrates a block diagram of the transaction engine 205 of FIG. 2, according to aspects of an embodiment of the invention. According to this embodiment, the transaction engine 205 comprises an operating system 305 having a handling thread and a listening thread. The operating system 305 may advantageously be similar to those found in conventional high volume servers, such as, for example, Web servers available from Apache. The listening thread monitors the incoming communication from one of the communication link 125, the authentication engine 215, and the cryptographic engine 220 for incoming data flow. The handling thread recognizes particular data structures of the incoming data flow, such as, for example, the foregoing data structures, thereby routing the incoming data to one of the communication link 125, the depository 210, the authentication engine 215, the cryptographic engine 220, or the mass storage 225. As shown in FIG. 3, the incoming and outgoing data may advantageously be secured through, for example, SSL technology.

Figure 4:
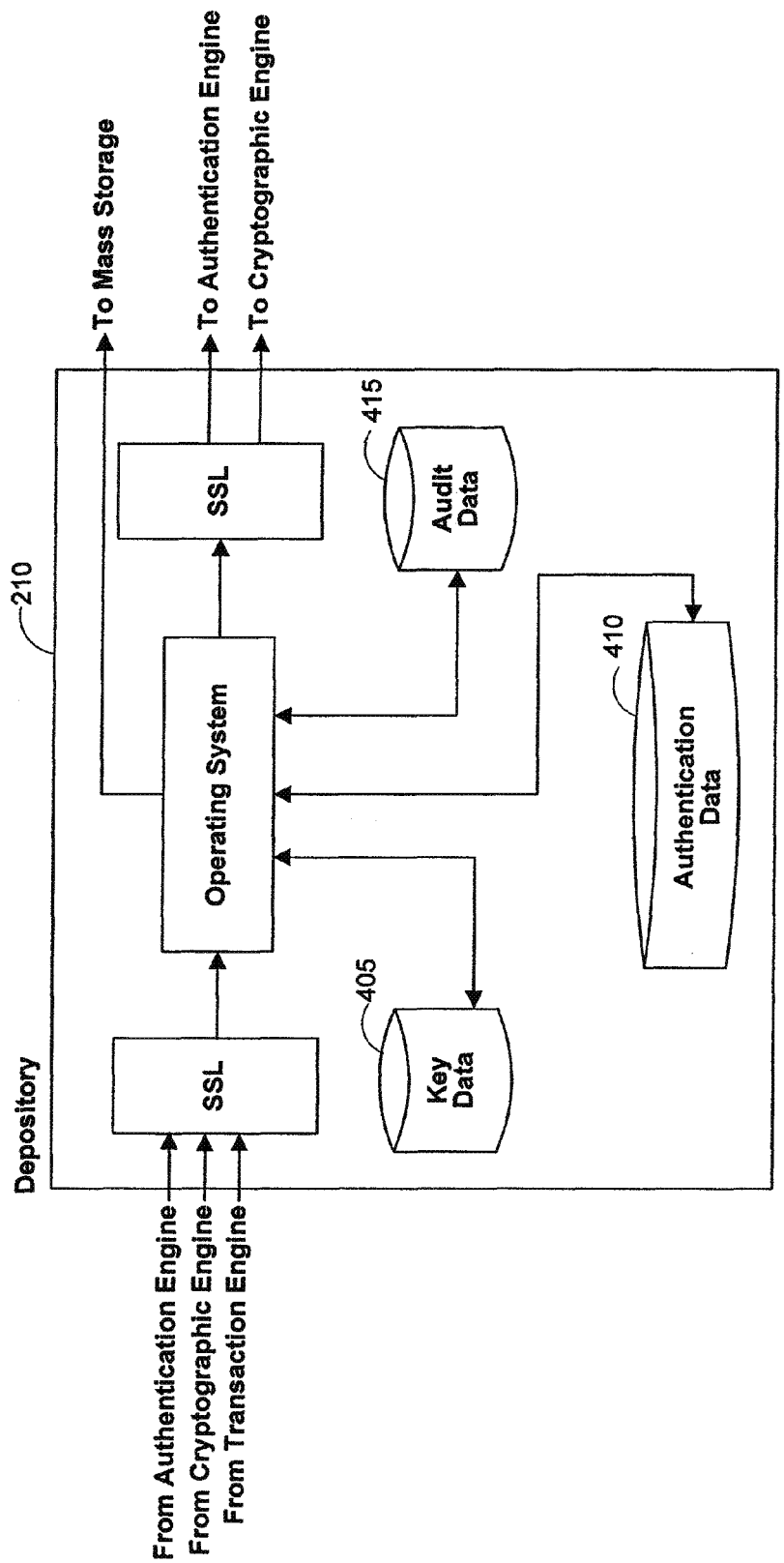
FIG. 4 illustrates a block diagram of the depository of FIG. 2, according to aspects Of an embodiment of the invention.

FIG. 4 illustrates a block diagram of the depository 210 of FIG. 2 according to aspects of an embodiment of the invention. According to this embodiment, the depository 210 comprises one or more lightweight directory access protocol (LDAP) servers. LDAP directory servers are available from a wide variety of manufacturers such as Netscape, ISO, and others. FIG. 4 also shows that the directory server preferably stores data 405 corresponding to the cryptographic keys and data 410 corresponding to the enrollment authentication data. According to one embodiment, the depository 210 comprises a single logical memory structure indexing authentication data and cryptographic key data to a unique user ID. The single logical memory structure preferably includes mechanisms to ensure a high degree of trust, or security, in the data stored therein. For example, the physical location of the depository 210 may advantageously include a wide number of conventional security measures, such as limited employee access, modern surveillance systems, and the like. In addition to, or in lieu of, the physical securities, the computer system or server may advantageously include software solutions to protect the stored data. For example, the depository 210 may advantageously create and store data 415 corresponding to an audit trail of actions taken. In addition, the incoming and outgoing communications may advantageously be encrypted with public key encryption coupled with conventional SSL technologies.

Figure 7:
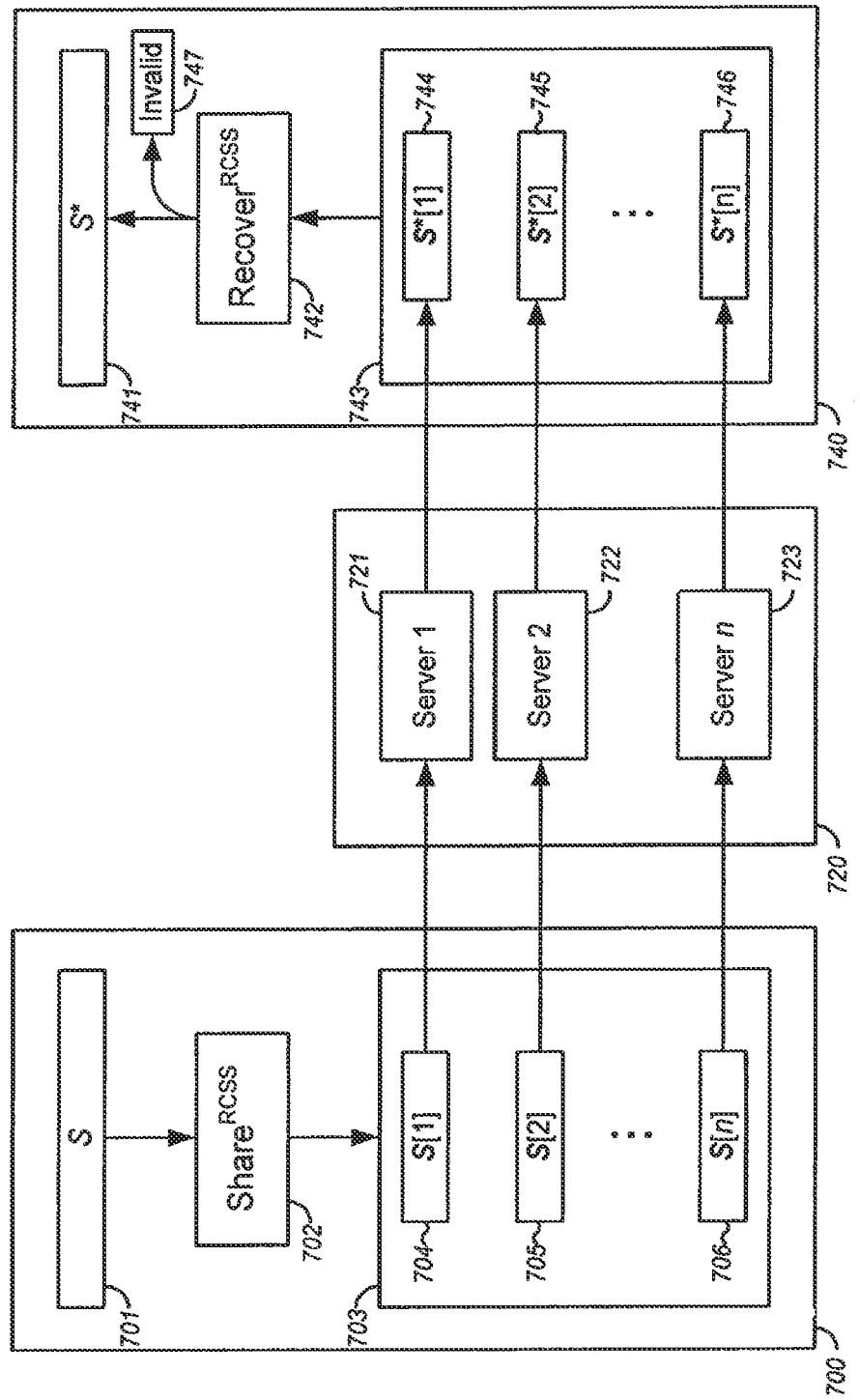
FIG. 7 is an illustrative block diagram depicting the overall structure of a robust computational secret sharing (RCSS) scheme in accordance with one embodiment of the invention.

According to another embodiment, the depository 210 may comprise distinct and physically separated data storage facilities, as disclosed further with reference to FIG. 7.

Figure 5:
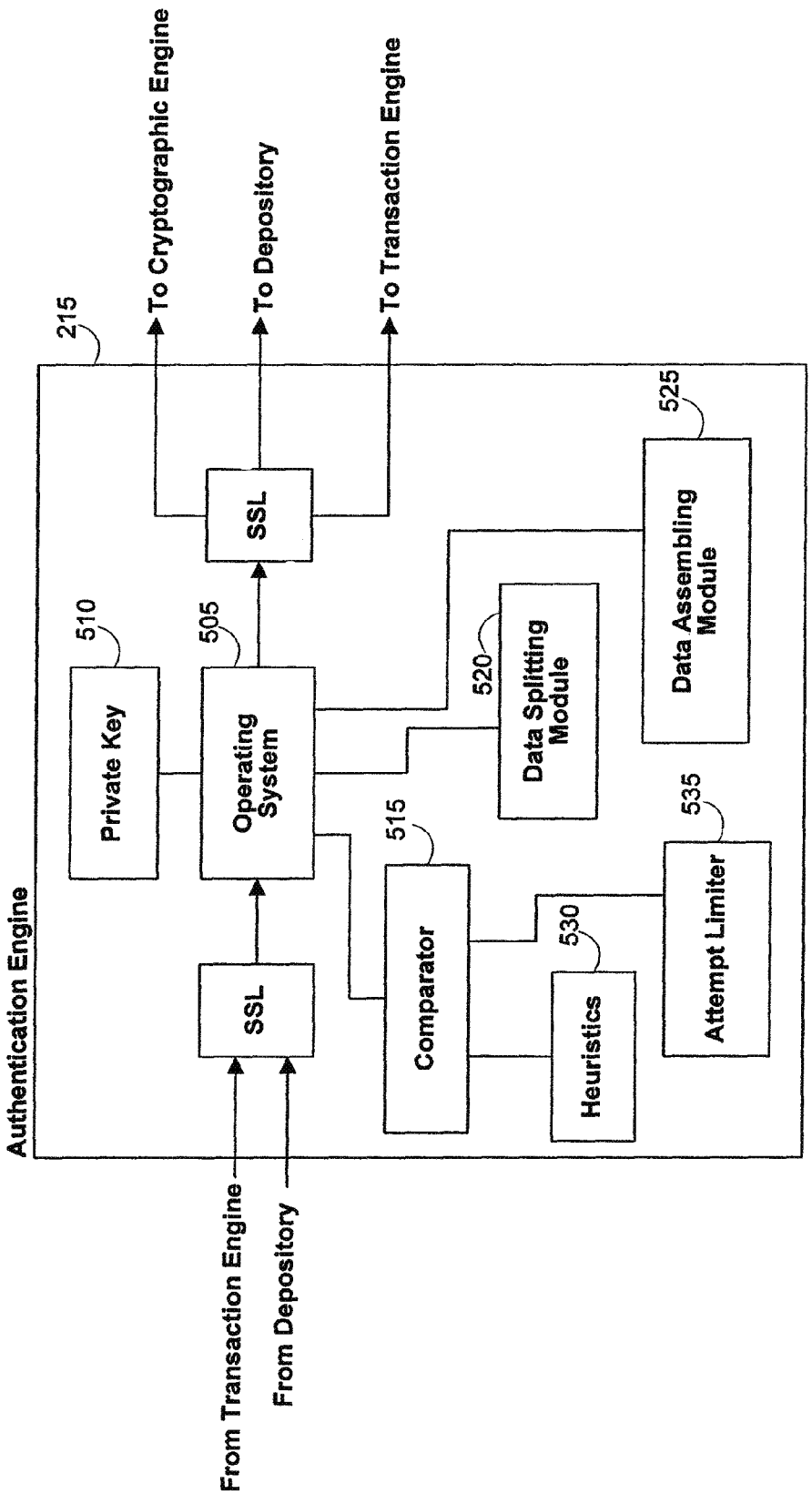
FIG. 5 illustrates a block diagram of the authentication engine of FIG. 2, according to aspects of an embodiment of the invention.

FIG. 5 illustrates a block diagram of the authentication engine 215 of FIG. 2 according to aspects of an embodiment of the invention. Similar to the transaction engine 205 of FIG. 3, the authentication engine 215 comprises an operating system 505 having at least a listening and a handling thread of a modified version of a conventional Web server, such as, for example, Web servers available from Apache. As shown in FIG. 5, the authentication engine 215 includes access to at least one private key 510. The private key 510 may advantageously be used for example, to decrypt data from the transaction engine 205 or the depository 210, which was encrypted with a corresponding public key of the authentication engine 215.

FIG. 5 also illustrates the authentication engine 215 comprising a comparator 515, a data splitting module 520, and a data assembling module 525. According to the preferred embodiment of the invention, the comparator 515 includes technology capable of comparing potentially complex patterns related to the foregoing biometric authentication data. The technology may include hardware, software, or combined solutions for pattern comparisons, such as, for example, those representing finger print patterns or voice patterns. In addition, according to one embodiment, the comparator 515 of the authentication engine 215 may advantageously compare conventional hashes of documents in order to render a comparison result. According to one embodiment of the invention, the comparator 515 includes the application of heuristics 530 to the comparison. The heuristics 530 may advantageously address circumstances surrounding an authentication attempt, such as, for example, the time of day, IP address or subnet mask, purchasing profile, email address, processor serial number or ID, or the like.

Moreover, the nature of biometric data comparisons may result in varying degrees of confidence being produced from the matching of current biometric authentication data to enrollment data. For example, unlike a traditional password which may only return a positive or negative match, a fingerprint may be determined to be a partial match, e.g. a 90% match, a 75% match, or a 10% match, rather than simply being correct or incorrect. Other biometric identifiers such as voice print analysis or face recognition may share this property of probabilistic authentication, rather than absolute authentication.

When working with such probabilistic authentication or in other cases where an authentication is considered less than absolutely reliable, it is desirable to apply the heuristics 530 to determine whether the level of confidence in the authentication provided is sufficiently high to authenticate the transaction which is being made.

It will sometimes be the case that the transaction at issue is a relatively low value transaction where it is acceptable to be authenticated to a lower level of confidence. This could include a transaction which has a low dollar value associated with it (e.g., a $10 purchase) or a transaction with low risk (e.g., admission to a members-only web site).

Conversely, for authenticating other transactions, it may be desirable to require a high degree of confidence in the authentication before allowing the transaction to proceed. Such transactions may include transactions of large dollar value (e.g., signing a multi-million dollar supply contract) or transaction with a high risk if an improper authentication occurs (e.g., remotely logging onto a government computer).

The use of the heuristics 530 in combination with confidence levels and transactions values may be used as will be described below to allow the comparator to provide a dynamic context-sensitive authentication system.

According to another embodiment of the invention, the comparator 515 may advantageously track authentication attempts for a particular transaction. For example, when a transaction fails, the trust engine 110 may request the user to re-enter his or her current authentication data. The comparator 515 of the authentication engine 215 may advantageously employ an attempt limiter 535 to limit the number of authentication attempts, thereby prohibiting brute-force attempts to impersonate a user's authentication data. According to one embodiment, the attempt limiter 535 comprises a software module monitoring transactions for repeating authentication attempts and, for example, limiting the authentication attempts for a given transaction to three. Thus, the attempt limiter 535 will limit an automated attempt to impersonate an individual's authentication data to, for example, simply three "guesses." Upon three failures, the attempt limiter 535 may advantageously deny additional authentication attempts. Such denial may advantageously be implemented through, for example, the comparator 515 returning a negative result regardless of the current authentication data being transmitted. On the other hand, the transaction engine 205 may advantageously block any additional authentication attempts pertaining to a transaction in which three attempts have previously failed.

The authentication engine 215 also includes the data splitting module 520 and the data assembling module 525. The data splitting module 520 advantageously comprises a software, hardware, or combination module having the ability to mathematically operate on various data so as to substantially randomize and split the data into portions. According to one embodiment, original data is not recreatable from an individual portion. The data assembling module 525 advantageously comprises a software, hardware, or combination module configured to mathematically operate on the foregoing substantially randomized portions, such that the combination thereof provides the original deciphered data. According to one embodiment, the authentication engine 215 employs the data splitting module 520 to randomize and split enrollment authentication data into portions, and employs the data assembling module 525 to reassemble the portions into usable enrollment authentication data.

Figure 6:
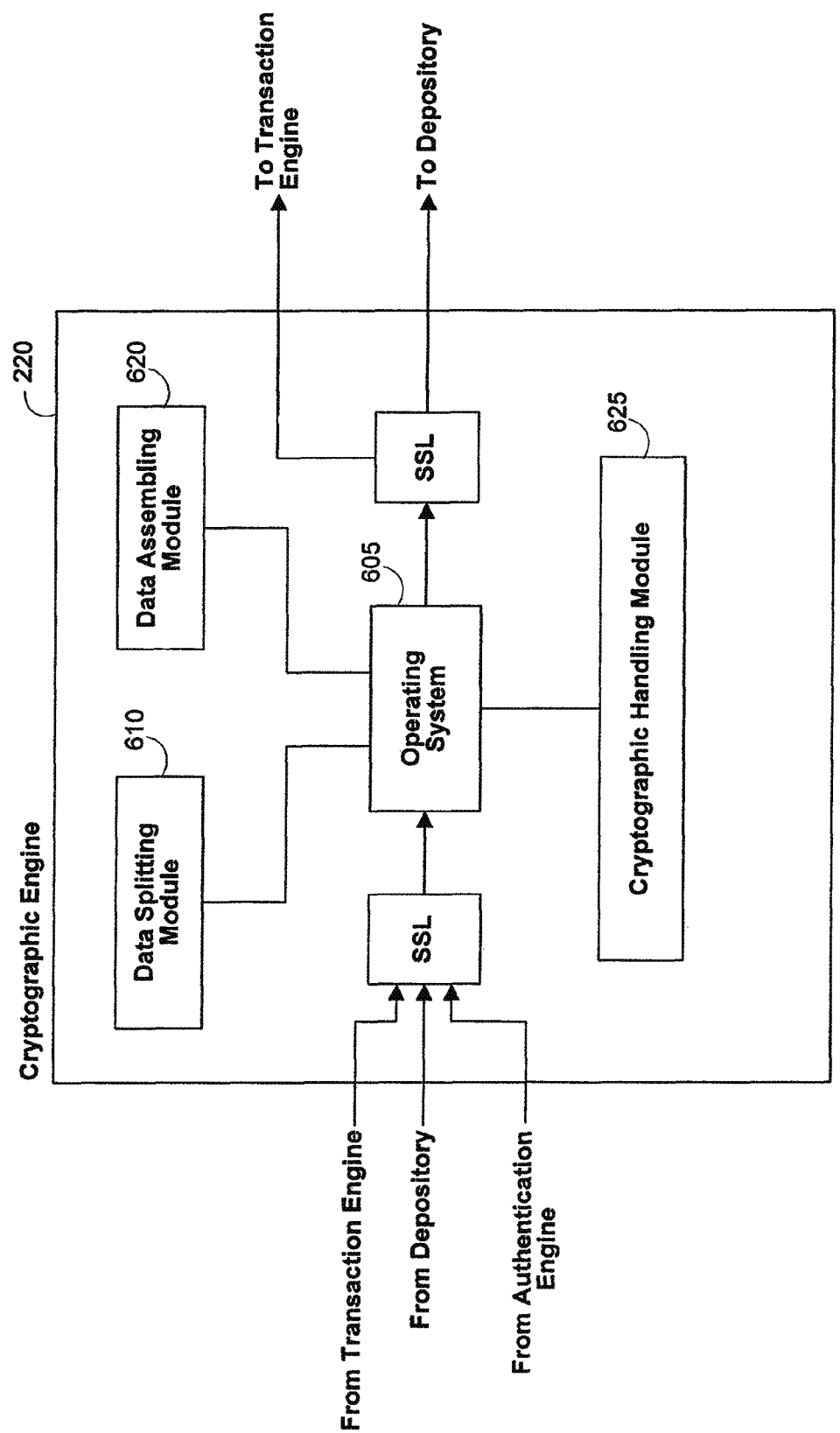
FIG. 6 illustrates a block diagram of the cryptographic engine of FIG. 2, according to aspects of an embodiment of the invention.

FIG. 6 illustrates a block diagram of the cryptographic engine 220 of the trust engine 200 of FIG. 2 according to aspects of one embodiment of the invention. Similar to the transaction engine 205 of FIG. 3, the cryptographic engine 220 comprises an operating system 605 having at least a listening and a handling thread of a modified version of a conventional Web server, such as, for example, Web servers available from Apache. As shown in FIG. 6, the cryptographic engine 220 comprises a data splitting module 610 and a data assembling module 620 that function similar to those of FIG. 5. However, according to one embodiment, the data splitting module 610 and the data assembling module 620 process cryptographic key data, as opposed to the foregoing enrollment authentication data. Although, a skilled artisan will recognize from the disclosure herein that the data splitting module 910 and the data splitting module 620 may be combined with those of the authentication engine 215.

The cryptographic engine 220 also comprises a cryptographic handling module 625 configured to perform one, some or all of a wide number of cryptographic functions. According to one embodiment, the cryptographic handling module 625 may comprise software modules or programs, hardware, or both. According to another embodiment, the cryptographic handling module 625 may perform data comparisons, data parsing, data splitting, data separating, data hashing, data encryption or decryption, digital signature verification or creation, digital certificate generation, storage, or requests, cryptographic key generation, or the like. Moreover, a skilled artisan will recognize from the disclosure herein that the cryptographic handling module 825 may advantageously comprises a public-key infrastructure, such as Pretty Good Privacy (PGP), an RSA-based public-key system, or a wide number of alternative key management systems. In addition, the cryptographic handling module 625 may perform public-key encryption, symmetric-key encryption, or both. In addition to the foregoing, the cryptographic handling module 625 may include one or more computer programs or modules, hardware, or both, for implementing seamless, transparent, interoperability functions.

A skilled artisan will also recognize from the disclosure herein that the cryptographic functionality may include a wide number or variety of functions generally relating to cryptographic key management systems.

A robust computational secret sharing (RCSS) scheme is illustrated in FIG. 7. A party referred to as the dealer 700 has a secret 701 that the dealer wishes to distribute. To this end, the dealer 700 may apply sharing mechanism 702 of an RCSS scheme. The sharing mechanism 702 may result in some number, n, of shares being generated, as indicated by shares 704, 705, and 706. Collection 703 of all the shares may be a vector S probabilistically derived from secret 701. Collection 703 of the shares may then be sent across a network or distributed out of band, so that each share is stored on its own data repository (or at different physical or geographical locations on one or more data repositories). Storing the shares on logical data repository 720 may have the benefit of increased security, in that it may be more difficult for an adversary to obtain access to all of the shares, which may be stored at data servers 721, 722, and 723, than a proper subset of those shares. One or more of servers 721, 722, and 723 may be located at physically different sites, operated under different administrative control, or protected by heterogeneous hardware and software access controls. Logical data repository 720 may also include a distributed or networked file system.

When a party wishes to recover the secret that was distributed on logical data repository 720, entity 740 may attempt to collect the shares. First collected share S*[1] 744 may be the same as share 704, but it also could differ due to unintentional modification in transmission or storage (e.g., data corruption), or intentional modification due to the activities of an adversarial agent. Similarly, second collected share S*[2] 745 may be the same as share 705, and last share S*[n] 746 may be the same as share 706, but these shares could also differ for similar reasons. In addition to the possibility of being a "wrong" share, one or more shares in collection 743 could also be the distinguished value "missing", represented by the symbol "◊". This symbol may indicate that the system (e.g., entity 740) is unable to find or collect that particular share. The vector of purported shares S* may then be provided to recovery algorithm 742 of the RCSS scheme, which may return either recovered secret S* 741 or the value designated as invalid 747. The shared secret 701 should equal the recovered secret 741 unless the degree of adversarial activity in corrupting shares exceeds that which the scheme was designed to withstand.

The RCSS goal is useful across two major domains: securing data at rest and securing data in motion. In the former scenario, a file server, for example, maintains its data on a variety of remote servers. Even if some subset of those servers are corrupted (for example, by dishonest administrators) or unavailable (for example, due to a network outage), data may still be both available and private. In the data-in-motion scenario, the sender of a secret message and the receiver of the message may be connected by a multiplicity of paths, only some of which may be observed by the adversary. By sending the shares over these different paths, the sender may securely transmit the secret S despite the possibility of some paths being temporarily unavailable or adversarially controlled. For example, in some embodiments, each share may be transmitted over a different logical communication channel. Systems and methods for securing data, and in particular systems and methods for securing data in motion, are described in more detail in U.S. patent application Ser. No. 10/458,928, filed Jun. 11, 2003, U.S. patent application Ser. No. 11/258,839, filed Oct. 25, 2005, and U.S. patent application Ser. No. 11/602,667, filed Nov. 20, 2006. The disclosures of each of the aforementioned earlier-filed patent applications is hereby incorporated by reference herein in their entireties.

Although at least one RCSS scheme with short share sizes has been proposed by Krawczyk, the scientific study of that scheme reveals that it is not a valid RCSS scheme under weak assumptions on the encryption scheme, and it is not known to be a valid scheme for all access structures (e.g., access structures other than the threshold schemes). For at least these reasons, FIGS. 8-11 describe other approaches for secret sharing. These other approaches are sometimes referred to herein as ESX or HK2.

The mechanism of the ESX or HK2 approach may include a robust computational secret sharing scheme that may be constructed from the following five primitives: (1) a random or pseudo-random number generator, (2) an encryption scheme; (3) a perfect secret sharing (PSS) scheme; (4) an information dispersal algorithm (IDA); and (5) a probabilistic commitment scheme. These five primitives are described in more detail below.

(1) A random or pseudo-random number generator, Rand. Such a number generator may take a number k as input and returns k random or pseudorandom bits. In FIGS. 8-11, the input k is elided for ease of illustration.

(2) An encryption scheme, which may include a pair of algorithms, one called Encrypt and the other called Decrypt. The encryption algorithm Encrypt may take a key K of a given length k and an input message M that is referred to as the plaintext. The Encrypt algorithm may return a string C that is referred to as the ciphertext. The Encrypt algorithm may optionally employ random bits, but such random bits are not expressly shown in the drawings. The decryption algorithm Decrypt may take a key K of a given length k and an input message C that is referred to as the ciphertext. The Decrypt algorithm may return a string M that is referred to as the plaintext. In some cases, the decryption algorithm may return a designated failure value, which may indicate that the ciphertext C does not correspond to the encryption of any possible plaintext.

(3) A perfect secret sharing (PSS) scheme, which may include a pair of algorithms SharePSS and RecoverPSS. The first of these algorithms, known as the sharing algorithm of the PSS, may be a probabilistic map that takes as input a string K, called the secret, and returns a sequence of n strings, K[1], ..., K[n], referred to as shares. Each K[i] may include one share or the n shares that have been dealt, or distributed, by the dealer (the entity carrying out the sharing process). The number n may be a user-programmable parameter of the secret sharing scheme, and it may include any suitable positive number. In some embodiments, the sharing algorithm is probabilistic in that it employs random or pseudo-random bits. Such a dependency can be realized by providing the sharing algorithm random or pseudo-random bits, as provided by the Rand algorithm. The second algorithm, known as the recovery algorithm of the PSS, may take as input a vector of n strings referred to as the purported shares. Each purported share is either a string or a distinguished symbol "◇" which is read as missing. This symbol may be used to indicate that some particular share is unavailable. The recovery algorithm for the perfect secret sharing scheme may return a string S, or the recovered secret. Two properties of the PSS scheme may be assumed. The first property, the privacy property, ensures that no unauthorized set of users obtains any useful information about the secret that was shared from their shares. The second property, the recoverability property, ensures that an authorized set of parties can always recover the secret, assuming that the authorized parties contribute correct shares to the recovery algorithm and that any additional party contributes either a correct share or the distinguished missing ("◇") value. This PSS scheme may include the Shamir scheme commonly referred to as "Shamir Secret Sharing" or the Blakley secret sharing scheme.

(4) An information dispersal algorithm (IDA), which may include a pair of algorithms ShareIDA and RecoverIDA. The first of these algorithms, known as the sharing algorithm of the IDA, may include a mechanism that takes as input a string C, the message to be dispersed, and returns a sequence of n strings, $C[1], \ldots, C[n]$, which are referred to as the chunks of the data that have resulted from the dispersal. The value of n may be a user-programmable parameter of the IDA, and it may be any suitable positive number. The sharing algorithm of the IDA may be probabilistic or deterministic. In FIGS. 8-11, the possibility of using random bits in the IDA is not explicitly shown; however, it should be understood that random bits may be used in the IDA in other embodiments.

The second algorithm, known as the recovery algorithm of the IDA, may take as input a vector of n strings, the supplied chunks. Each supplied chunk may be a string or the distinguished symbol "◇", which is read as missing and is used to indicate that some particular data chunk is unavailable. The recovery algorithm for the IDA may return a string S, the recovered secret. The IDA may be assumed to have a recoverability property; thus, an authorized set of parties can always recover the data from the supplied chunks, assuming that the authorized parties contribute correct chunks to the recovery algorithm of the IDA and that any additional party participating in reconstruction contributes either a correct chunk or else the distinguished missing ("◇") value. Unlike the case for a PSS scheme, there may be no privacy property associated with the IDA and, in fact, one simple and practical IDA is to replicate the input C for n times, and to have the recovery algorithm use the value that occurs most often as the recovered data. More efficient IDAs are known (for example, Rabin's IDA).

(5) A probabilistic commitment scheme, which may include a pair of algorithms, Ct and Vf, called the committal algorithm and the verification algorithm. The committal algorithm Ct may be a probabilistic algorithm that takes a string M to commit to and returns a committal value, H (the string that a player can use to commit to M) and also a decommittal value, R (the string that a player can use to decommit to the committal H for M). The committal algorithm may be probabilistic and, as such, can take a final argument, R*, which is referred to as the algorithm's coins. These coins may be earlier generated by a call to a random or pseudo-random number generator, Rand. The notation "Ct(M; R*)" is sometimes used herein to explicitly indicate the return value of the committal algorithm Ct on input M with random coins –R*. The verification algorithm, Vf, may be a deterministic algorithm that takes three input strings: a committal value H, a string M, and a decommittal value R. This algorithm may return a bit 0 or 1, with 0 indicating that the decommittal is invalid (unconvincing) and 1 indicating that the decommittal is valid (convincing).

In general, a commitment scheme may satisfy two properties: a hiding property and a binding property. The hiding property entails that, given a randomly determined committal H for an adversarially chosen message $M_0$ or $M_1$, the adversary is unable to determine which message H the committal corresponds to. The binding property entails that an adversary, having committed to a message $M_0$ by way of a committal $H_0$ and corresponding decommital $R_0$, is unable to find any message $M_1$ distinct from $M_0$ and any decommital $R_1$ such that $Vf(H_0, M_1, R_1)=1$. In most cases, the decommittal value R produced by a commitment scheme Ct(M; R*) is precisely the random coins R* provided to the algorithm (i.e., R=R*). However, this property is not required in all cases. The most natural probabilistic commitment schemes may be obtained by way of suitable cryptographic hash functions, such as SHA-1. There are a variety of natural techniques to process the value being committed to, M, and the coins, R*, before applying the cryptographic hash functions. Any commitment scheme containing a commitment mechanism Ct and verification algorithm Vf may yield a commitment mechanism Commit and verification mechanism Verify that applies to vectors of strings instead of individual strings. The commitment algorithm Commit may apply the Ct algorithm component-wise, and the verification algorithm Verify may apply the Vf algorithm component-wise. For Ct, separate random coins may be used for each component string in some embodiments.

Figure 8:
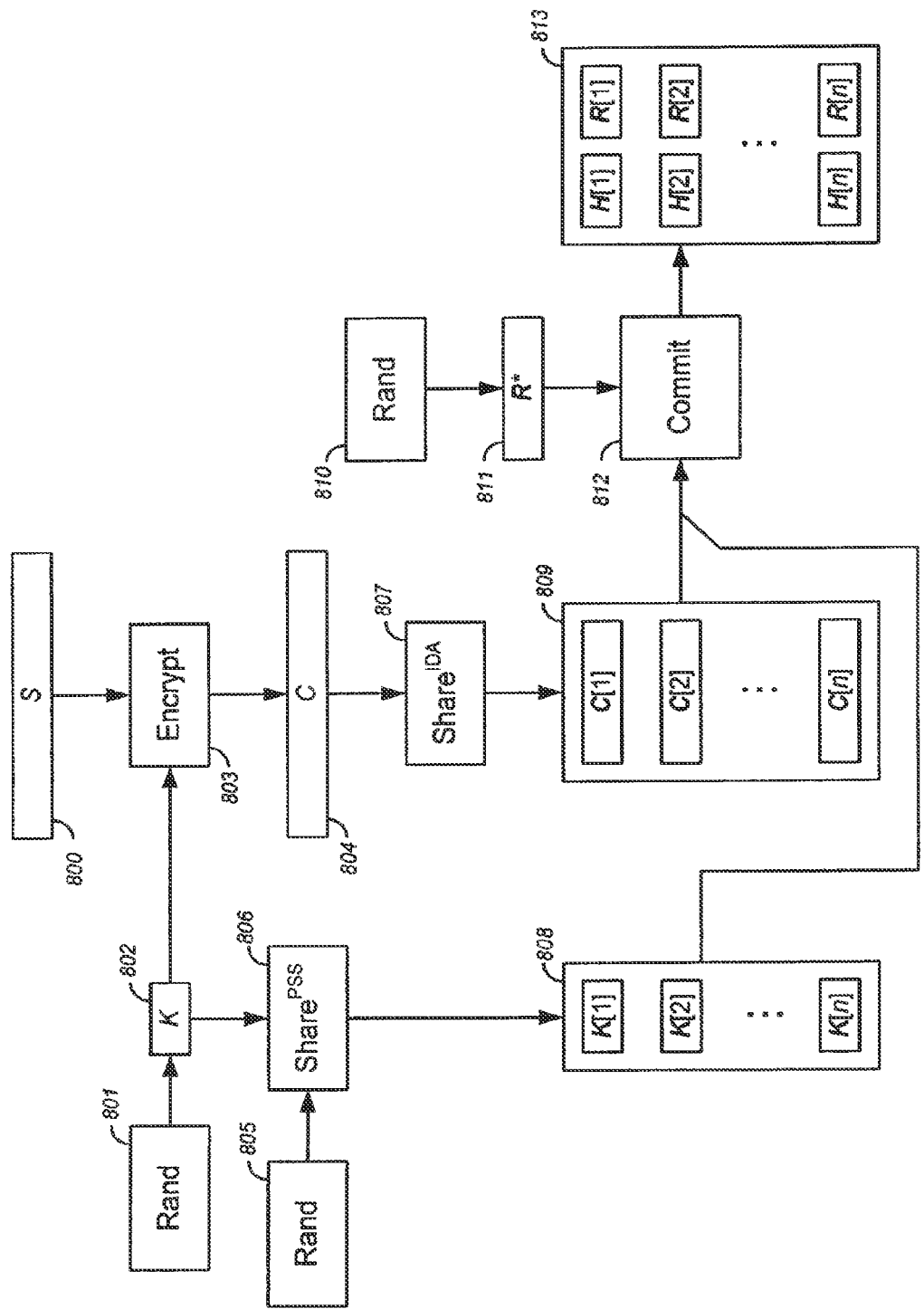
FIG. 8 illustrates the secret sharing process in accordance with one embodiment of the invention.

FIG. 8 shows a simplified block diagram of the sharing mechanism of the RCSS scheme in accordance with one embodiment of the invention. Secret, S, 800 may include the secret that the dealer wishes to distribute or share. Secret 800 may be a file in a file system, a message arising in a communications protocol, or any other piece of sensitive data. Secret 800 may be represented as any suitable encoded string (e.g., a binary-encoded or ASCII string). In actual implementations, however, binary strings may be used as secret 800 for ease of implementation. Secret S may be first encrypted using the encryption algorithm 803 of a shared-key encryption scheme to obtain a ciphertext C 804. The key K 802 for performing this encryption may be obtained using the output of random or pseudo-random number generator 801 so as to produce the appropriate number of random or pseudo-random bits for key 802.

Key 802 may be used for only one sharing, and can therefore be referred to as a one-time key. In addition to being used to encrypt secret 800, key 802 may also be shared or distributed using perfect secret sharing (PSS) scheme 806. PSS scheme 806 may include any perfect secret sharing scheme, including the Shamir or Blakley secret sharing schemes. Perfect secret sharing scheme 806 may be randomized, requiring its own source of random (or pseudo-random) bits. The random or pseudo-random-bits may be provided by a separate random or pseudo-random number generator, such as number generator 805. PSS scheme 806 may output a vector of key shares $K=K[1], \ldots, K[n]$ 808 which, conceptually, may be sent out to the different "players," one share per player. First, though, the key shares may be combined with additional information in some embodiments. Ciphertext C 804 may be split up into chunks 809 using information dispersal algorithm (IDA) 807, such as Rabin's IDA mechanism. IDA 807 may output a vector of ciphertext chunks $C[1], \ldots, C[n]$ 809. Then, commit mechanism 812 of a probabilistic commitment scheme may be employed. A sufficient number of random bits are generated for the commitment process using random or pseudo-random number generator 810, and the resulting random string 811 is used for all committals at commit mechanism 812. Commit mechanism 812 may determine a committal value H[i] and a decommittal value R[i], collectively shown in vector 813, for each message M[i]=K[i]C[i] (spread across 808 and 809). The $i^{th}$ share (which is not explicitly represented in FIG. 8) may encode K[i] 808, C[i] 809, R[i], and H[1], ..., H[n] 813. Each party i may receive in its share the committal H[j] for each K[j], C[j] (for j in 1 ... n) and not simply the committal for its own share.

Figure 9:
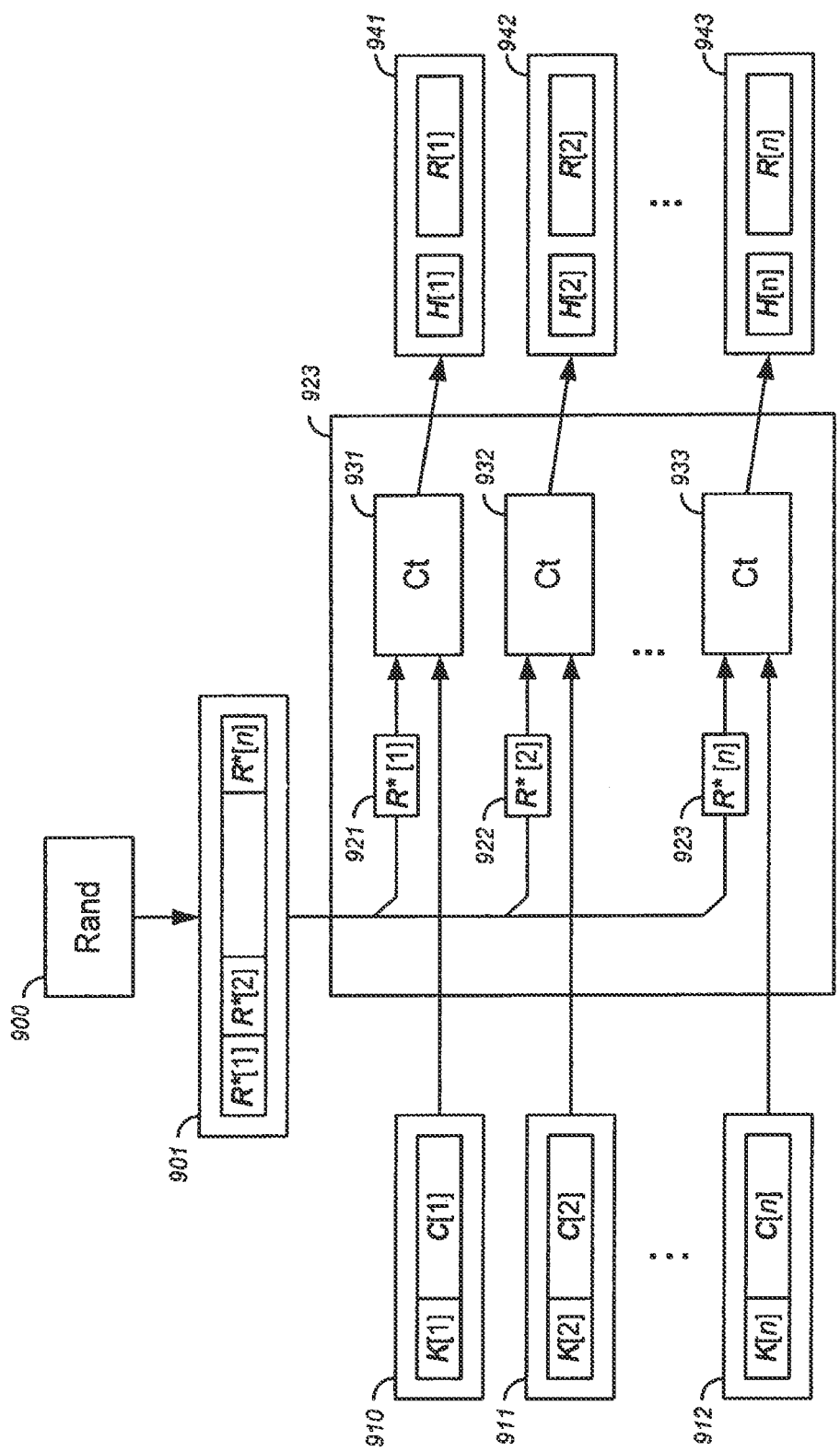
FIG. 9 illustrates more detail of the committal steps shown in FIG. 8 in accordance with one embodiment of the invention.

FIG. 9 shows the illustrative commitment process of commit mechanism 812 (FIG. 8) in more detail. The Commit process entails n different calls to the lower-level Ct mechanism of the commitment scheme. Randomness is generated by random or pseudo-random number generator 900 and the resulting random or pseudo-random string R* is partitioned into n segments, R*[1] R*[2], ..., R* [n] 901. The $i^{th}$ portion of the randomness (one of portions 921, 922, or 923 when i is 1, 2, or n) is used to commit to the $i^{th}$ message that is being committed to, M[i]=K[i]C[i] (shown as messages 910, 911, 912) using commitment algorithms Ct 931, 932, and 933 of a commitment scheme. Committal and decommittal pairs 941, 942, and 943 may be output by the Ct algorithm. It is likely that each R[i] is simply R*[i], but this is not strictly required or assumed.

The algorithm labeled "Share" in Table 1, below, further explains the sharing scheme depicted in FIGS. 8 and 9. This algorithm takes as input a string S, the secret that is to be shared. At line 10, a sufficient number of random coin tosses are generated to provide an encryption key K for a symmetric encryption scheme consisting of algorithms Encrypt and Decrypt. At line 11, the sensitive string S that is to be shared is encrypted using key K so as to create a ciphertext C. The encryption may be randomized, but it need not be for the mechanism to function correctly. Next, at line 12, the sharing algorithm of a perfect secret sharing scheme (such as Shamir's scheme) may be invoked. The sharing algorithm is probabilistic, although this is not explicitly indicated in the code. The sharing results in a vector of key shares, K= K[1] ... K[n]. At line 13, the ciphertext C may be split into a collection of chunks tram which an authorized subcollection of chunks will be adequate to recover the secret. This may be performed using the sharing algorithm of an IDA (e.g., IDA 807 of FIG. 8). Any valid IDA may be used, such as Rabin's mechanism, replication, or any ad hoc scheme with the IDA property earlier described. Lines 15 and 16 comprise a probabilistic committal of the message KC[i]=K[i]C[i], with the needed coins being generated at line 15 and the committal H[i] and decommittal R[i] being computed using these coins. Line 17 computes the resultant share (sometimes referred to as "fragment" herein) S[i] from the values already computed. The share in the subject RCSS scheme is S[i]=R[i]K[i] C[i] H[1] ... H[n]. The shares may then be returned to the caller, to be stored at different sites or transmitted over a variety of channels, according to the caller's intent.

The recovery algorithm of the RCSS scheme is also shown in Table 1, below. This time, the caller provides an entire vector of purported shares, S S[1] ... S[n]. Each purported share S[i] may be a string or the distinguished symbol "◊", which again stands for a missing share. It may also be assumed, in some embodiments, that the caller provides the identity of a share j, where j is between 1 and n inclusive, which is known to be valid. At lines 20-21, each S[i] may be parsed into its component strings R[i] C[i], and H[1] ... H[n]. It is understood that the missing symbol, "◊", may parse into components all of which are themselves the missing symbol ◊. At line 23, the verification algorithm of the commitment scheme may be executed to determine if message KC[i]=R[i]C[i] appears to be valid. The "known valid" share j may then be used as the "reference value" for each commitment Whenever a K[i] C[i] value appears to be invalid, it may be replaced by the missing symbol. The vector of K[i] values that have been so revised may now be supplied the recovery algorithm of the secret sharing scheme at line 25, while the vector of revised C[i] values may be supplied to the recovery algorithm of the IDA at line 26. At this point, one needs only to decrypt the ciphertext C recovered from the IDA under the key K recovered from the PSS scheme to get the value S that is recovered by the RCSS scheme itself.

TABLE 1

Share and Recover mechanisms of the RCSS scheme.

| | |
|---|---|
| Algorithm Share (S) | |
| 10 | K ← Rand(k) |
| 11 | C ← Encrypt$_K$(S) |
| 12 | K ← Share$^{PSS}$(K) |
| 13 | C ← Share$^{IDA}$(C) |
| 14 | for i←1 to n do |
| 15 | R* [i] ← Rand (k') |
| 16 | (H[i], R[i]) ← Ct (K[i]C[i]; R*[i]) |
| 17 | S[i] ← R[i]K[i] C[i] H[l] ... H[n] |
| 18 | return S |
| Algorithm Recover (S, j) | |
| 20 | for i←1 to n do |
| 21 | R[i]K[i] C[i] H$_i$[l] ... H$_i$[n] ← S[i] |
| 22 | for i←1 to n do |
| 23 | if S[i] ≠ ◊ and Vf (H$_j$[i], K[i]C[i], R[i]) |
| 24 | then K[i] ← ◊, C[i] ← ◊ |
| 25 | K ← Recover$^{PSS}$(K) |
| 26 | C ← Recover$^{IDA}$(C) |
| 27 | S ← Decrypt$_K$(C) |
| 28 | return S |

As indicated above, the Recover algorithm of Table 1 assumes that the user supplies the location of a known-valid share. In the absence of this, other means may be employed to determine a consensus value for H[i]. The most natural possibility used in some embodiments is the majority vote. For example, in lieu of H$_j$[i] at line 23 a value of H[i] may be used that occurs most frequently among the recovered H$_j$[i] values, for j ranging from 1 to n.

Figure 10:
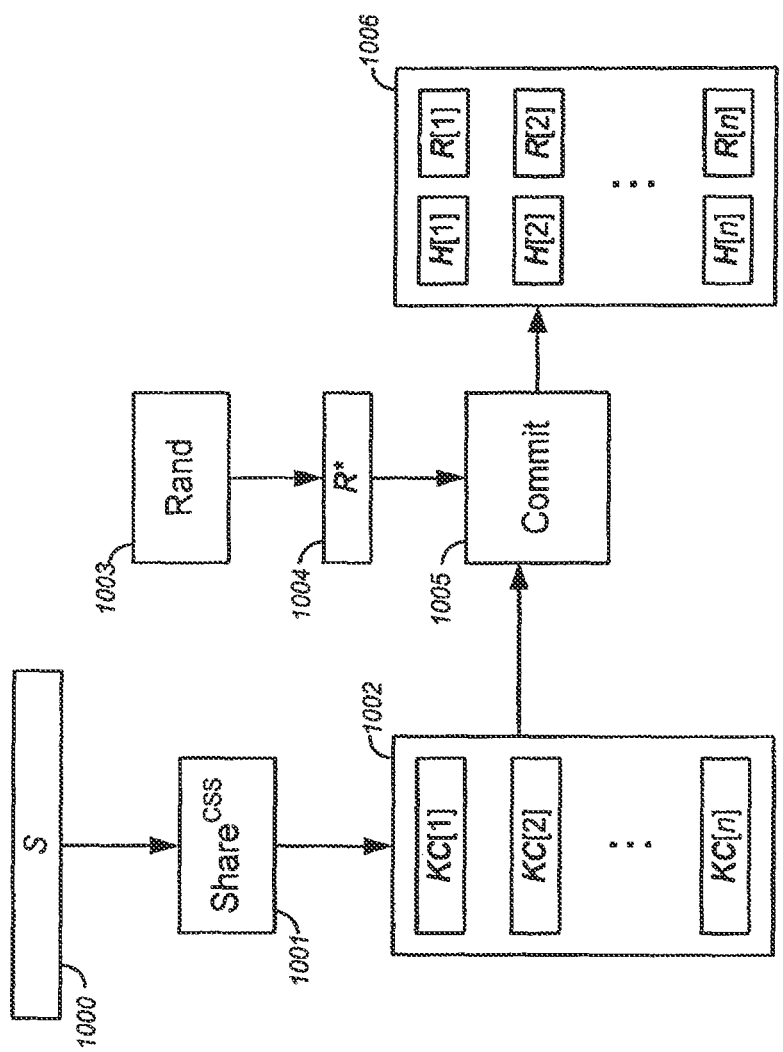
FIG. 10 illustrates the sharing process based on a different abstraction of building an RCSS scheme from a CSS scheme and a commitment scheme.

Returning briefly to FIG. 8, the portion of the figure that is labeled 801 through 807 may be implemented or regarded as a single process including a computational secret sharing (CSS) of S to obtain the vector of shares KC=(KC[1], ..., KC[n]) where KC[I]=K[i] C[i], with a probabilistic committal applied to the resulting vector of shares. FIG. 10 shows a scheme described from this alternative embodiment. In this embodiment, the following three primitives are employed, rather than the earlier five primitives defined in connection with FIGS. 8 and 9: (1) a random or pseudo-random number generator, Rand; (2) a computational secret sharing (CSS) scheme; and (3) a probabilistic commitment scheme.

The random or pseudo-random number generator, Rand, may be defined as before. The computational secret sharing scheme may include a pair of algorithms Share$^{CSS}$ and Recover$^{CSS}$. The first of these algorithms, know as the sharing algorithm of the CSS, may be a probabilistic map that takes as input a string K, called the secret, and returns a sequence of n strings, K[1], ..., K[n], referred to as shares. Each K[i] may include one share or the n shares that have been dealt, or distributed, by the dealer (the entity carrying out the sharing process). The number n may be a parameter of the secret sharing scheme, and it may be an arbitrary positive number. The sharing algorithm may be probabilistic in that it may employ random or pseudorandom bits. Such a dependency may be realized by providing the sharing algorithm random or pseudorandom bits, as provided by the random or pseudo-random number generator, Rand.

The second algorithm, knows as the recovery algorithm of the CSS, takes as input a vector of n strings, referred to as the purported shares. Each purported share is either a string or a distinguished symbol "◊", which is read as missing and is used to indicate that some particular share is unavailable or unknown. The recovery algorithm for the computational secret sharing scheme may return a string S, the recovered secret. Since the pair of algorithms make up a computational secret sharing scheme, two properties may be assumed. The first property, the privacy property, may ensure that no unauthorized set of users obtains any significant (computationally extractable) information about the secret that was shared from their shares. The second property, the recoverability property, ensures that an authorized set of parties can always recover the secret, assuming that the authorized parties contribute correct shares to the recovery algorithm and that any additional party contributes either a correct share or else the distinguished missing ("◊") value.

The third primitive in this embodiment is a probabilistic commitment scheme, which may be implemented as described above in connection with FIGS. 8 and 9.

Referring to FIG. 10, secret string S 1000 may be shared, or distributed, using Share algorithm of a (probabilistic) computational secret sharing scheme. This may result in n shares, KC[1], . . . , KC[n] 1002. A probabilistic commitment scheme 1005 may then be employed to obtain vector 1006 of committals and decommittals. The probabilistic committal may employ coin tosses 1004 generated by some random or pseudo-random number generator 1003. Share 1 of the RCSS scheme, S[1], may include the share KC[1] from the CSS scheme 1002 together with the decommittal R[1] from the commitment scheme 1006 together with the vector of committals H[1] . . . H[n] from the commitment scheme 1006. Share 2 of the RCSS scheme, S[2], may include the share KC[2] from the CSS scheme 1002 together with the decommittal R[2] from the commitment scheme 1006 together with the vector of committals H[1] . . . H(n) from the commitment scheme 1006. This process may continue, with share n of the RCSS scheme, S[n], including the share KC[n] from the CSS scheme 1002 together with the decommittal R[n] from the commitment scheme 1006 together with the vector of committals H[1] . . . H[n] from the commitment scheme 1006.

Figure 11:
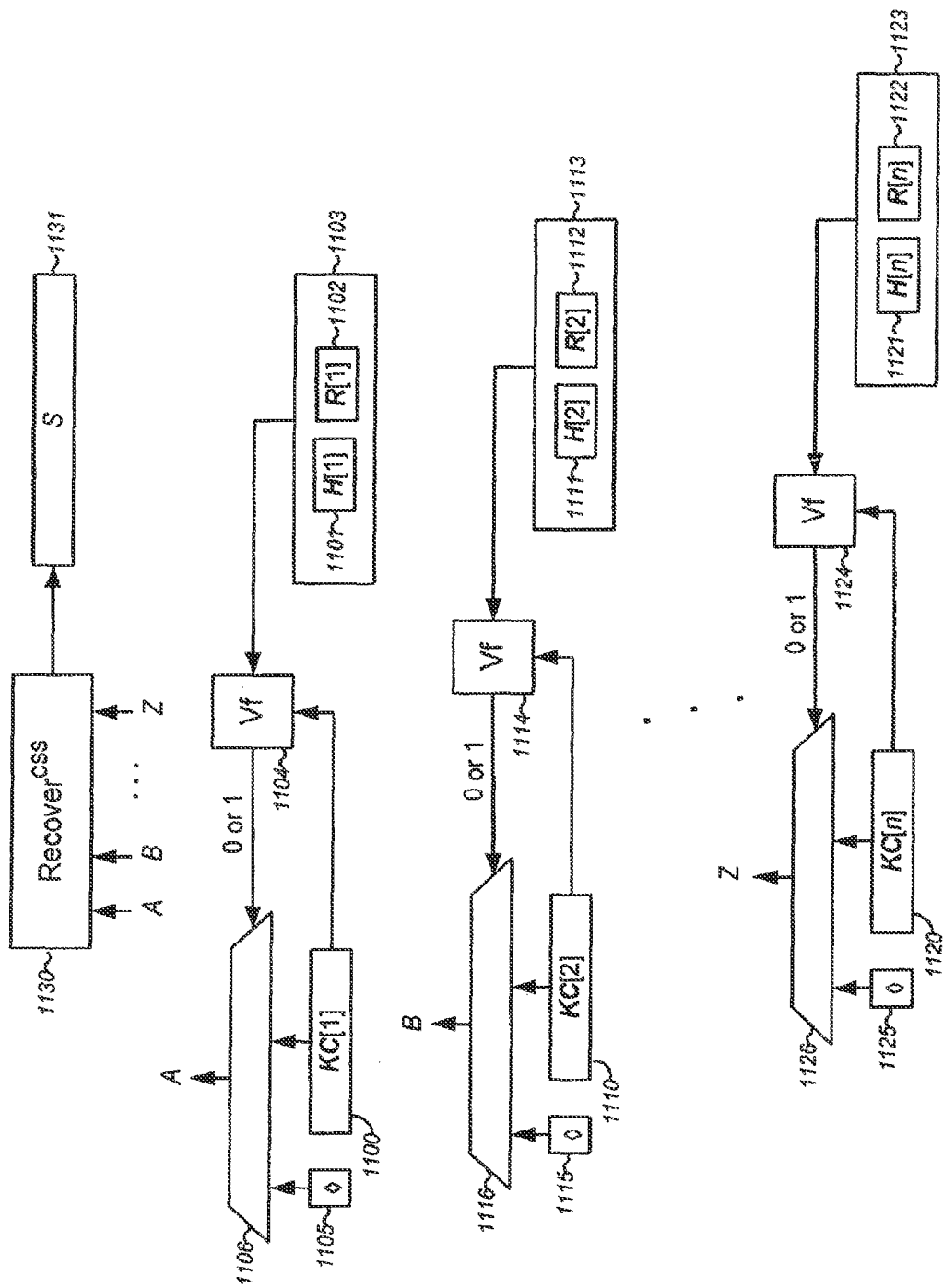
FIG. 11 illustrates more detail of the verification steps in the probabilistic committal scheme shown in FIG. 10.

FIG. 11 illustrates the recovery process of the RCSS scheme just described. Recover algorithm 1130 is provided a vector of purported shares, which are sometimes called fragments herein, to distinguish these shares from the shares of the CSS scheme. The $i^{th}$ fragment received by Recover algorithm 1130 gets parsed to form a string KC[i], a decommittal value R[i], and a vector of committals $H_i = H_i(1) \ldots H_i[n]$. From the collection of vectors of committals $H_1(i) \ldots H_n(i)$, Recover algorithm 1130 must determine a consensus committal H[i]. For the setting in which Recover algorithm 1130 is provided an index j for a player whose share is known to be valid, the consensus value H[i] may be selected to be $H_j[i]$. For the case where no such share is known to be authentic, the consensus value may be selected as a most frequently occurring string value among $H_1[1], \ldots, H_n[i]$. FIG. 11 depicts the shares KC[1] 1100, KC[2] 1110, and KC[n] 1120 parsed out of the $1^{st}$, $2^{nd}$, and $n^{th}$ fragments provided to the RCSS Recover algorithm, respectively. The example shown in FIG. 11 likewise depicts the decommital values R[1] 1102, R[2] 1112, and R[n] 1122 the RCSS Recover algorithm, respectively. FIG. 11 also depicts the consensus committal values H[1] 1101, H[2] 1111, and H[n] 1121, determined in the manner described above. Focusing on the processing of the first fragment, verification algorithm Vf 1104 of the probabilistic commitment scheme is called on the committal H[1], the message KC[1], and the decommital R[1]. The algorithm may return a bit, with, for example, 0 indicating that the message KC[1] should not be accepted as having been decommitted, and 1 indicating that it should. Accordingly, a demultiplexer 1106 is fed the decision bit of the verification algorithm, with, for example, a 0 indicating that the recovered value should be regarded as missing ("◊") 1105 and a 1 indicating that the recovered value should be regarded as KC[1] itself 1100. The output A is the first input supplied to the Recover algorithm 1130 of a CSS scheme. Continuing in this manner, fragment 2 is processed (shown at 1110-1116 in the example of FIG. 11) and each additional fragment is processed, until the $n^{th}$ is processed (shown at 1120-1126 in the example of FIG. 11). The collection of shares are then provided to Recover algorithm 1130 of the CSS scheme so as to recover the secret. That recovered value may be the value output by the RCSS scheme itself.

Those skilled in the art will realize that a great number of variants are possible. For example, an error correcting code may be used in some embodiments to provide an adequate collection of committals H[1] . . . H[n] for each player, effectively replacing the simple but somewhat inefficient replication code of the prior embodiment.

Although some common applications are described above, it should be clearly understood that the present invention may be integrated with any network application in order to increase security, fault-tolerance, anonymity, or any suitable combination of the foregoing.

Additionally, other combinations, additions, substitutions and modifications will be apparent to the skilled artisan in view of the disclosure herein. Accordingly, the present invention is not intended to be limited by the reaction of the preferred embodiments but is to be defined by a reference to the appended claims.

What is claimed is:

1. A method for securing data by generating a collection of fragments from the data, the method comprising:
   applying by a hardware processor a sharing mechanism of a computational secret sharing scheme to the data to produce a collection of shares;
   generating a random or pseudo-random value;
   computing a set of committal values and a set of decommittal values from the random or pseudo-random value and the collection of shares;
   producing each fragment in the collection of fragments by combining a share, a decommittal value, and at least two committal values of the set of committal values; and
   storing each fragment on at least one data repository.

2. The method of claim 1 where in producing each fragment in the collection of fragments comprises combining a share, a decommittal value, and the entire set of committal values.

3. The method of claim 1 wherein storing each fragment on at least one data repository comprises storing each fragment at different geographic locations.

4. The method of claim 1 wherein storing each fragment on at least one data repository comprises storing each fragment at different physical locations on the at least one data repository.

5. The method of claim 1 wherein the at least one data repository comprises a distributed file system.

6. The method of claim 1 wherein the computational secret sharing scheme is selected from the group consisting of the Shamir, Blakley, and Krawczyk secret sharing schemes.

7. The method of claim 1 wherein computing a set of committal values and a set of decommittal values comprises employing a probabilistic commitment scheme.

8. The method of claim 1 further comprising transmitting the produced fragments over a plurality of communication channels.

9. The method of claim 8 wherein transmitting the produced fragments over a plurality of communication channels comprises transmitting each produced fragment over a different communication channel.

10. A method for securing data, the method comprising:
applying by a hardware processor a sharing mechanism of a computational secret sharing scheme to the data to produce a collection of shares;
using a probabilistic commitment scheme to compute a set of committal values and a set of decommittal values from the collection of shares;
producing a plurality of fragments, wherein each fragment comprises a share of the collection of shares, a decommittal value of the set of decommittal values, and at least two committal values of the set of committal values; and
storing each fragment on at least one data repository.

11. The method of claim 10 wherein storing each fragment on at least one data repository comprises storing each fragment at different geographic locations.

12. The method of claim 10 wherein storing each fragment on at least one data repository comprises storing each fragment at different physical locations on the at least one data repository.

13. The method of claim 10 wherein the at least one data repository comprises a distributed file system.

14. The method of claim 10 wherein the computational secret sharing scheme is selected from the group consisting of the Shamir, Blakley, and Krawczyk secret sharing schemes.

15. The method of claim 10 further comprising transmitting the produced fragments over a plurality of communication channels.

16. The method of claim 15 wherein transmitting the produced fragments over a plurality of communication channels comprises transmitting each produced fragment over a different communication channel.

17. A method for securing data comprising;
generating a cryptographic key;
encrypting by a hardware processor the data with the cryptographic key to create a ciphertext;
producing a collection of key shares by applying a secret sharing scheme to the cryptographic key;
producing a collection of ciphertext chunks by applying an information dispersal algorithm to the ciphertext;
computing n committal values and a set of decommittal values by applying a probabilistic commitment scheme to each of the key shares and ciphertext chunks, where n is an integer equal to or greater than two;
producing a collection of data fragments, wherein each data fragment is a function of a key share, a ciphertext chunk, a decommittal value, and at least two committal values of the n committal values; and
storing the data fragments on different logical storage devices, whereby the data is recoverable from a predefined number of the data fragments.

18. The method of claim 17 wherein storing the data fragments on different logical storage devices comprises storing the data fragments on different logical storage devices.

19. The method of claim 17 further comprising transmitting the data fragments over communication channels before storing the data fragments.

* * * * *